United States Patent
Lee et al.

(10) Patent No.: US 10,135,795 B2
(45) Date of Patent: Nov. 20, 2018

(54) DOWNLINK CONTROL CHANNEL ENCRYPTION FOR JAMMING RESILIENCE

(71) Applicant: QUALCOMM Incorporated, San Diego, CA (US)

(72) Inventors: Soo Bum Lee, San Diego, CA (US); Keiichi Kubota, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 15/269,902

(22) Filed: Sep. 19, 2016

(65) Prior Publication Data

US 2017/0279778 A1    Sep. 28, 2017

Related U.S. Application Data

(60) Provisional application No. 62/312,287, filed on Mar. 23, 2016.

(51) Int. Cl.
*H04L 29/06* (2006.01)
*H04W 12/04* (2009.01)
(Continued)

(52) U.S. Cl.
CPC .......... *H04L 63/0428* (2013.01); *H04L 63/06* (2013.01); *H04L 63/0876* (2013.01);
(Continued)

(58) Field of Classification Search
CPC . H04L 63/0428; H04L 63/06; H04L 63/0876; H04L 63/123; H04L 5/14;
(Continued)

(56) References Cited

U.S. PATENT DOCUMENTS

| 2008/0310353 | A1* | 12/2008 | Love | H04L 1/0009 370/329 |
| 2014/0057617 | A1* | 2/2014 | Kobayashi | H04W 8/22 455/418 |

(Continued)

OTHER PUBLICATIONS

ETSI, "Digital Cellular Telecommunications System (Phase 2+); Universal Mobile Telecommunications System (UMTS); LTE; 3GPP System Architecture Evolution (SAE); Security Architecture (3GPP TS 33.401 version 12.13.0 Release 12)", Jan. 1, 2015, 133 pgs, XP055371915, Retrieved from the Internet: URL:http://www.etsi.org/deliver/etsi_ts/133400_133499/133401 /12.13.00_60/ts_133401v121300p.pdf [retrieved on May 11, 2017].
(Continued)

*Primary Examiner* — Michael S McNally
(74) *Attorney, Agent, or Firm* — Holland & Hart LLP

(57) ABSTRACT

Methods, systems, and devices for wireless communication are described. The methods, systems, and devices may employ mechanisms for encrypting downlink control channels for jamming resilience. The methods, systems, and devices may include or may be configured to generate and receive a security configuration, obtain a downlink control channel encryption key, transmit a control channel message, and decrypt the transmitted messaged based on the encryption key.

28 Claims, 16 Drawing Sheets

(51) Int. Cl.
  *H04W 12/06* (2009.01)
  *H04W 72/04* (2009.01)
  *H04W 76/27* (2018.01)
  *H04L 5/14* (2006.01)

(52) U.S. Cl.
  CPC ........... H04L 63/123 (2013.01); H04W 12/04 (2013.01); H04W 12/06 (2013.01); H04W 72/042 (2013.01); *H04L 5/14* (2013.01); *H04L 2209/80* (2013.01); *H04W 76/27* (2018.02)

(58) Field of Classification Search
  CPC ... H04W 12/04; H04W 12/06; H04W 72/042; H04W 76/27
  USPC .......................................................... 713/168
  See application file for complete search history.

(56) References Cited

U.S. PATENT DOCUMENTS

| | | | |
|---|---|---|---|
| 2015/0138992 A1 | 5/2015 | Jover | |
| 2015/0382188 A1* | 12/2015 | Jover | H04W 12/04 380/270 |
| 2017/0163365 A1* | 6/2017 | Ohwatari | H04J 1/06 |
| 2017/0237484 A1* | 8/2017 | Heath | H04B 10/07953 398/26 |

OTHER PUBLICATIONS

ISR/EP, International Search Report and Written Opinion of the International Searching Authority, Int'l Application No. PCT/US2017/022871, dated May 31, 2017, European Patent Office, Rijswijk, NL, 16 pgs.

\* cited by examiner

DOWNLINK CONTROL CHANNEL ENCRYPTION FOR JAMMING RESILIENCE

CROSS REFERENCES

The present application for patent claims priority to U.S. Provisional Patent Application No. 62/312,287 by Lee et al., entitled "Downlink Control Channel Encryption for Jamming Resilience," filed Mar. 23, 2016, assigned to the assignee hereof.

INTRODUCTION

The following relates generally to wireless communication, and more specifically to downlink control channel encryption for jamming resilience.

Wireless communications systems are widely deployed to provide various types of communication content such as voice, video, packet data, messaging, broadcast, and so on. These systems may be capable of supporting communication with multiple users by sharing the available system resources (e.g., time, frequency, and power) and may also support the internet of things (IoT). Examples of such multiple-access systems include code division multiple access (CDMA) systems, time division multiple access (TDMA) systems, frequency division multiple access (FDMA) systems, and orthogonal frequency division multiple access (OFDMA) systems. A wireless multiple-access communications system may include a number of base stations, each simultaneously supporting communication for multiple communication devices, which may each be referred to as a user equipment (UE).

At times, a wireless communications system may be vulnerable to a variety of insecurities. Many association, authentication, and verification processes may be employed that are designed to help mitigate or prevent such insecurities. However, in some cases, a wireless communications system may be vulnerable to jamming attacks from a jamming device. The jamming device may be configured to overload, or otherwise interfere with, resources (e.g., time, frequency, etc.) of the wireless communications system in order to disrupt communication between one or more base station and one or more UEs. For example, a jamming device may determine identifiers associated with one or more UEs and may then transmit signals that jam uplink and/or downlink radio resources that the UE uses for communication with a base station.

The jamming device may have limited power and signal strength, and often cannot identify the precise location of all the UEs in a wireless communications system. Therefore, such a jamming device is not capable of jamming the entire radio spectrum within the entire coverage area of a wireless communications system. Thus, the jamming device may launch a targeted jamming attack directed toward specific devices and for that purpose, may use the physical downlink control channel (PDCCH) broadcasted by the base station to determine the resources to target.

SUMMARY

The described techniques relate to improved methods, systems, devices, or apparatuses that support downlink control channel encryption for jamming resilience. Generally, the described techniques provide for encryption of a PDCCH message. The PDCCH message may be encrypted by the base station based on a security configuration. The encrypted PDCCH message may be transmitted by the base station to a UE, which may then decrypt the PDCCH using an encryption key obtained using the security configuration. The encryption key may be common to multiple UEs or unique to each UE connected to the base station. Scheduling information (e.g., radio resource scheduling for uplink (UL) grant and downlink (DL) resource allocation) obtained from the decrypted PDCCH message may then be used by the UE to communicate with the base station.

A method of wireless communication is described. The method may include receiving a security configuration from a base station, obtaining a PDCCH encryption key based at least in part on the received security configuration and decrypting a PDCCH message from the base station based at least in part on the obtained encryption key.

An apparatus for wireless communication is described. The apparatus may include means for receiving a security configuration from a base station, means for obtaining a PDCCH encryption key based at least in part on the received security configuration and means for decrypting a PDCCH message from the base station based at least in part on the obtained encryption key.

A further apparatus is described. The apparatus may include a processor, memory in electronic communication with the processor, and instructions stored in the memory. The instructions may be operable to cause the processor to receive a security configuration from a base station, obtain a PDCCH encryption key based at least in part on the received security configuration and decrypt a PDCCH message from the base station based at least in part on the obtained encryption key.

A non-transitory computer readable medium for wireless communication is described. The non-transitory computer-readable medium may include instructions to cause a processor to receive a security configuration from the base station, obtain a PDCCH encryption key based on the received security configuration and decrypt a PDCCH message from the base station based on the obtained encryption key.

In some examples of the method, apparatus, or non-transitory computer-readable medium described above, obtaining the PDCCH encryption key includes deriving the PDCCH encryption key based on a shared key between the base station and the client device. In some examples of the method, apparatus, or non-transitory computer-readable medium described above, obtaining the PDCCH encryption key includes establishing a secure channel between the base station and the client device. Some examples of the method, apparatus, or non-transitory computer-readable medium described above may further include processes, features, means, or instructions for receiving the PDCCH encryption key from the base station over the secure channel established between the base station and the client device.

In some examples of the method, apparatus, or non-transitory computer-readable medium described above, decrypting the PDCCH message includes verifying integrity of the PDCCH message based on the received security configuration. In some examples of the method, apparatus, or non-transitory computer-readable medium described above, verifying the integrity of the PDCCH message includes computing a message authentication code (MAC) based at least in part on a PDCCH integrity protection key common to all client devices that receive the PDCCH integrity protection key from the base station. Some examples of the method, apparatus, or non-transitory computer-readable medium described above may further include processes, features, means, or instructions for verifying the integrity of the PDCCH message including computing a MAC based at least in part on a PDCCH integrity protection key unique to a client device. In some examples of the method, apparatus, or non-transitory computer-readable medium described above, a cyclic redundancy check (CRC) checksum of the PDCCH message is replaced by the MAC. Some examples of the method, apparatus, or non-transitory computer-readable medium described above may further include processes, features, means, or instructions for verifying the integrity of the PDCCH message including comparing the computed MAC with a MAC included within the PDCCH.

In some examples of the method, apparatus, or non-transitory computer-readable medium described above, receiving the security configuration includes establishing a secure channel between the base station and the client device. Some examples of the method, apparatus, or non-transitory computer-readable medium described above may further include processes, features, means, or instructions for receiving the security configuration over the secure channel established between the base station and the client device.

In some examples of the method, apparatus, or non-transitory computer-readable medium described above, the security configuration includes information indicating that the PDCCH message is encrypted using a multicast encryption key, or the PDCCH message is encrypted using a unicast encryption key, or the PDCCH message is protected using a MAC, or a combination thereof.

In some examples of the method, apparatus, or non-transitory computer-readable medium described above, the secure channel is established based on a shared key between the base station and the client device. In some examples of the method, apparatus, or non-transitory computer-readable medium described above, the secure channel comprises a radio resource control (RRC) channel.

A method of wireless communication is described. The method may include generating a security configuration, transmitting the security configuration to a client device, obtaining a PDCCH encryption key based at least in part on the security configuration, generating an encrypted PDCCH message based at least in part on the obtained PDCCH encryption key and transmitting the encrypted PDCCH message to the client device.

An apparatus for wireless communication is described. The apparatus may include means for generating a security configuration, means for transmitting the security configuration to a client device, means for obtaining a PDCCH encryption key based at least in part on the security configuration, means for generating an encrypted PDCCH message based at least in part on the obtained PDCCH encryption key and means for transmitting the encrypted PDCCH message to the client device.

A further apparatus is described. The apparatus may include a processor, memory in electronic communication with the processor, and instructions stored in the memory. The instructions may be operable to cause the processor to generate a security configuration, transmit the security configuration to a client device, obtain a PDCCH encryption key based at least in part on the security configuration, generate an encrypted PDCCH message based at least in part on the obtained PDCCH encryption key and transmit the encrypted PDCCH message to the client device.

A non-transitory computer readable medium for wireless communication is described. The non-transitory computer-readable medium may include instructions to cause a processor to generate a security configuration, transmit the security configuration to a client device, obtain a PDCCH encryption key based on the security configuration, generate an encrypted PDCCH message based on the obtained PDCCH encryption key and transmit the encrypted PDCCH message to the client device.

In some examples of the method, apparatus, or non-transitory computer-readable medium described above, the security configuration is based on a configuration of the base station.

In some examples of the method, apparatus, or non-transitory computer-readable medium described above, transmitting the security configuration includes establishing a secure channel between the base station and the client device. Some examples of the method, apparatus, or non-transitory computer-readable medium described above may further include processes, features, means, or instructions for transmitting the security configuration over the secure channel established between the base station and the client device.

In some examples of the method, apparatus, or non-transitory computer-readable medium described above, generating the encrypted PDCCH message includes encrypting a PDCCH message using the obtained PDCCH encryption key.

Some examples of the method, apparatus, or non-transitory computer-readable medium described above may further include processes, features, means, or instructions for transmitting the obtained PDCCH encryption key to the client device. In some examples of the method, apparatus, or non-transitory computer-readable medium described above, obtaining the PDCCH encryption key includes randomly generating the PDCCH encryption key.

In some examples of the method, apparatus, or non-transitory computer-readable medium described above, the PDCCH encryption key is obtained based on a device-specific encryption key. Some examples of the method, apparatus, or non-transitory computer-readable medium described above may further include processes, features, means, or instructions for generating the device-specific encryption key based on a shared key between the base station and the client device.

Some examples of the method, apparatus, or non-transitory computer-readable medium described above may further include processes, features, means, or instructions for establishing a secure channel between the base station and the client device based on a shared key between the base station and the client device.

In some examples of the method, apparatus, or non-transitory computer-readable medium described above, the security configuration includes information indicating that the PDCCH message is encrypted using a multicast encryption key, or the PDCCH message is encrypted using a unicast encryption key, or the PDCCH message is protected using a MAC, or a combination thereof. In some examples of the method, apparatus, or non-transitory computer-readable medium described above, generating the encrypted PDCCH message may include computing a MAC based at least in part on a PDCCH integrity protection key common to all client devices that receive the PDCCH integrity protection key from the base station.

In some examples of the method, apparatus, or non-transitory computer-readable medium described above, generating the encrypted PDCCH message may include computing a MAC based at least in part on a PDCCH integrity protection key unique to a client device. In some examples of the method, apparatus, or non-transitory computer-readable medium described above, a CRC checksum of the PDCCH message is replaced by the MAC. In some examples of the method, apparatus, or non-transitory computer-readable medium described above, the encrypted PDCCH message comprises a MAC.

DETAILED DESCRIPTION

Figure 1:
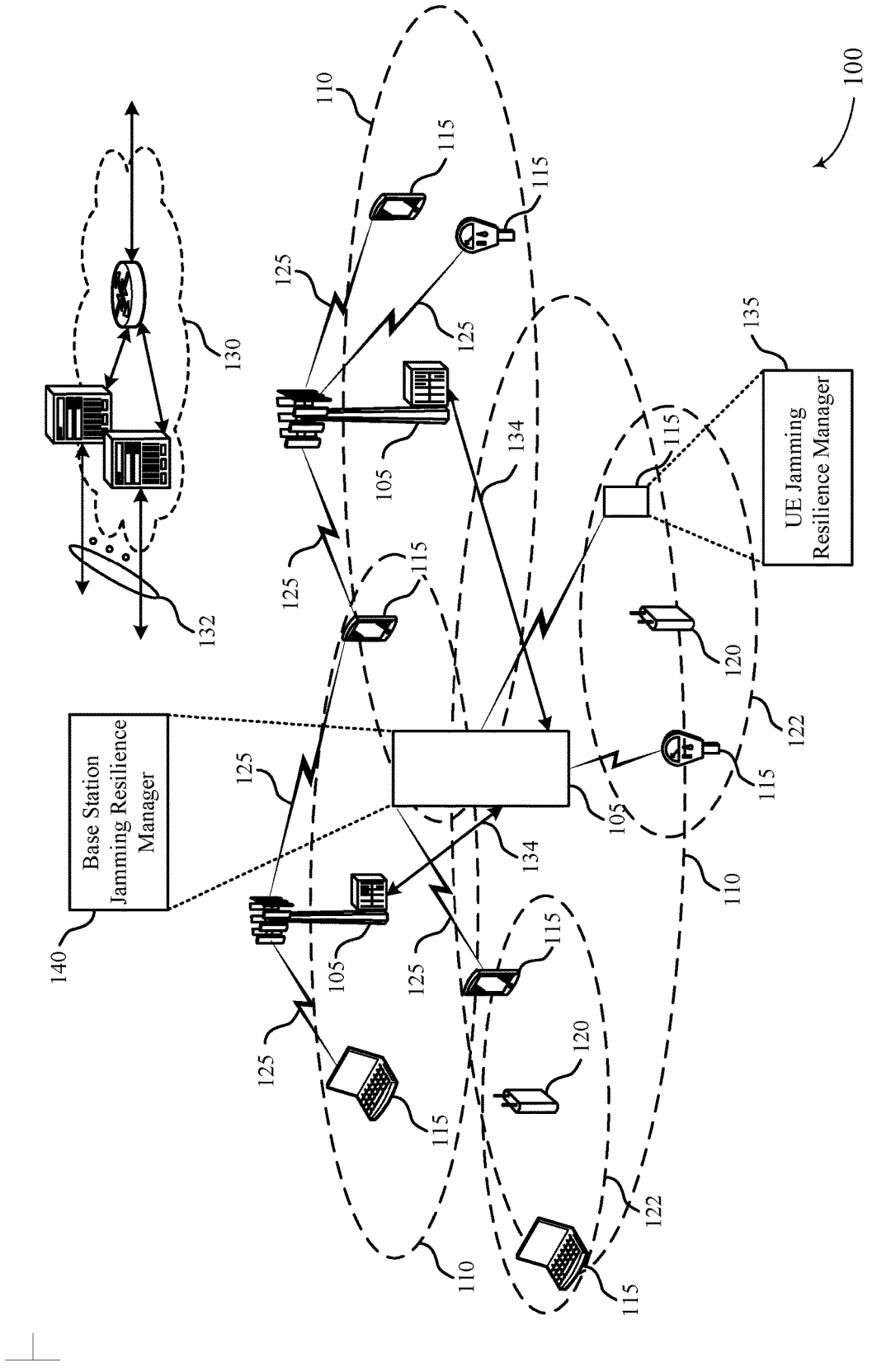
FIG. 1 illustrates an example of a wireless communications system that supports downlink control channel encryption for jamming resilience in accordance with one or more aspects of the present disclosure.

Mechanisms for jamming resilience implemented in a wireless communications system of a wireless network may be used to prevent or limit jamming attacks from a device seeking to attack one or more devices in the wireless network. For example, a base station and a wireless device (e.g., a UE) may utilize encryption of scheduling information (e.g., time and frequency resources allocated to one or more UEs for transmission and/or reception) transmitted by the base station to the UE. The encrypted scheduling information may then be decrypted by the UE and the UE may communicate with the base station based on the resources indicated in by the decrypted scheduling information. In one or more implementations, the scheduling information may be randomized, periodic, or otherwise not fixed, to prevent a jamming device from successfully jamming a known set of resources allocated for the UEs.

In one example of jamming resilience implemented in a wireless network, the scheduling information may be contained within a PDCCH message. The PDDCH message may be a message communicated over a control channel such as a PDDCH, an enhanced PDCCH (ePDCCH), a narrowband PDCCH (NPDCCH), a relay PDCCH (R-PDCCH), a machine type communication (MTC) PDCCH (MPDCCH), an overhead channel, or the like, or may be communicated using other channels (e.g., an RRC channel). The scheduling information may include UL grant(s) or DL resource allocation for one or more UEs. An UL grant may be transmitted (e.g., from a base station to a UE) in response to a scheduling request which grants the UE access to a set of radio resources for UL transmission. DL resource allocation may be carried in downlink control information (DCI) of the PDCCH indicating the resources allocated to a UE for DL communication. The PDCCH message may include scheduling information, such as UL grant(s) or DL resource allocation described above, for one or more UEs.

The PDCCH message may be transmitted from the base station to one or more UEs and may be encrypted using an encryption key. The encryption key and/or information related to the encryption of the PDCCH message may be transmitted (e.g., using a broadcast, multicast, or unicast channel) in a security configuration and may be transmitted over a secure channel (e.g., a secure RRC channel). The encryption key may be common to all UEs associated with or connected to the transmitting base station. The base station may also encrypt the PDDCH message using the PDCCH encryption key and may then transmit the encrypted PDCCH message to one or more UEs.

In some examples, the PDCCH message may be encrypted by the base station using an encryption key derived from one or more shared keys between, or otherwise known by, the base station and the UE. The encryption key may be device specific in that the encryption key is different for each UE connected to the base station. DCI may then be encrypted by the base station using the encryption key and transmitted to the UE in a PDCCH message.

In some aspects, the PDCCH message may also include integrity protection. For example, the PDCCH message may include a MAC to confirm to the UE whether any information within the PDCCH message has been changed during transmission. Integrity protection may utilize CRC verification and in some examples, the CRC checksum may be replaced by a MAC specific to each UE. The base station may derive a separate PDCCH integrity protection key for the UE or may use a PDCCH integrity protection key shared by multiple UEs. In some examples, the MAC may be computed for multiple DCIs corresponding to multiple UEs. The MAC may be carried in a DCI separate from the multiple DCIs of the multiple UEs or may be carried in the last DCI. To verify a MAC in this instance, a UE may concatenate all DCIs transmitted in a given subframe and compute the MAC based on those concatenated DCIs. The computed MAC may then be compared to the MAC included within the PDCCH message to verify the integrity of the PDCCH.

Features of the disclosure introduced above are further described below in the context of a wireless communications system. Specific examples are then described of example process flows for mechanisms jamming resilience in a network. These and other features of the disclosure are further illustrated by and described with reference to apparatus diagrams, system diagrams, and flowcharts that relate to mechanisms for jamming resilience in a network.

FIG. 1 illustrates an example of a wireless communications system 100 that supports jamming resilience in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network.

Base stations 105 may wirelessly communicate with UEs 115 via one or more base station antennas. Each base station 105 may provide communication coverage for a respective geographic coverage area 110. Communication links 125 shown in wireless communications system 100 may include UL transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, a client device, or like terminology. A UE 115 may also be a cellular phone, a wireless modem, a handheld device, a personal computer, a tablet, a personal electronic device, an MTC device, an IoT device, or the like.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and may generate scheduling information for communication with UEs 115, or may operate under the control of a base station controller (not shown). In some examples, base stations 105 may be macro cells, small cells, hot spots, or the like. Base stations 105 may also be referred to as evolved NodeBs (eNBs) 105.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that may make use of the information or present the information to humans interacting with the program or application. Some UEs 115 may be MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications.

A UE 115 may include a subscriber information module (SIM), which may be an integrated circuit (IC) that securely stores the international mobile subscriber identity (IMSI) and a related key used to identify and authenticate the UE 115. A SIM may also contain a unique serial number (e.g., an IC card identification (ID) (ICCID)), security authentication and ciphering information, temporary information related to the local network, a list of the services, a personal ID number (PIN), and a personal unblocking code (PUK) for PIN unlocking. In some cases, a SIM may be a circuit embedded in a removable card.

Wireless communications system 100 may be used to support the IoT, which may be used to refer to a network of physical objects that autonomously collect and exchange data with one another. In some examples, the wireless communications system 100 may be vulnerable to insecurities, such an attack directed toward one or more UEs 115 and/or one or more base stations 105 and designed to overload or interfere with resources of the wireless communications system 100.

In some examples, devices (e.g., base station 105, UE 115) within the wireless communications system 100 may be subject to jamming attacks caused by one or more jamming devices 120. A jamming device 120 may be located within or near the wireless communications system 100 and may launch an attack on specific UEs 115 or base stations 105 by identifying resources used for communication between the specific UEs 115 and/or base stations 105. For instance, the jamming device 120 may determine an identifier (e.g., IMSI, temporary mobile subscriber identity (TMSI), etc.) associated with a particular UE 115 and an associated cell radio network temporary identifier (C-RNTI). The jamming device 120 may then listen for a PDCCH message broadcasted by the base station 105 and decode scheduling information for the particular UE 115 based on the PDCCH message and the determined identifier(s). In some examples, the PDCCH for a UE 115 is scrambled using the C-RNTI associated with the UE 115. Using the decoded scheduling information, the jamming device 120 may determine resources allocated for communication between the base station 105 and the particular UE 115. The jamming device 120 may then transmit signals within a jamming coverage area 122 and/or toward a base station 105 to overload or otherwise interfere with the resources allocated for particular UEs 115. In doing so, the jamming device 120 could jeopardize the reception and/or transmission of critical messages, channels, and/or timings between the base station 105 and one or more UEs 115.

Accordingly, wireless devices in a wireless communications system 100, such as a base station 105 and/or a UE 115 may include jamming resilience managers, such as UE jamming resilience manager 135 and base station jamming resilience manager 140, to protect against attacks caused by one or more jamming devices 120.

Figure 2:
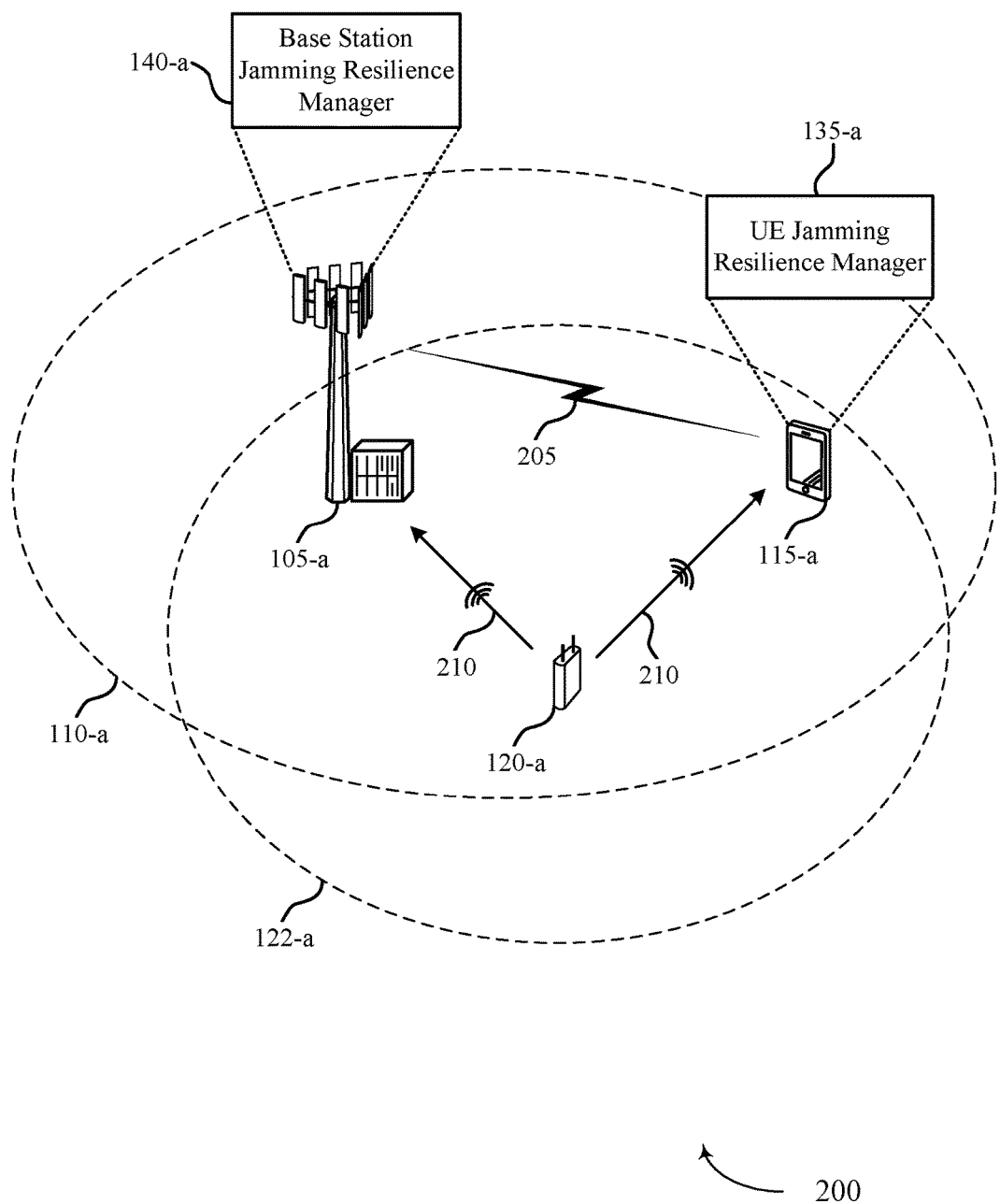
FIG. 2 illustrates an example of a wireless communications system that supports downlink control channel encryption for jamming resilience in accordance with one or more aspects of the present disclosure.

FIG. 2 illustrates an example of a wireless communications system 200 for downlink control channel encryption for jamming resilience in accordance with various aspects of the present disclosure. Wireless communications system 200 may include base station 105-a and UE 115-a, which may be examples of the corresponding devices described with reference to FIG. 1. In some implementations, the base station 105-a may include a base station jamming resilience manager 140-a and the UE 115-a may include a UE jamming resilience manager 135-a, as shown.

The base station 105-a may provide communication coverage for a coverage area 110-a and the UE 115-a may connect to, or at least attempt to connect with, the base station 105-a. The UE 115-a may connect or attempt to connect to the base station 105-a once the UE 115-a is located within base station coverage area 110-a or prior to entering the coverage area 110-a (e.g., if the UE 115-a is traveling toward the coverage area 110-a). In some examples, the UE 115-a may start a connection process with the base station 105-a by sending an attach request. The attach request may indicate whether the UE 115-a is a mission critical UE (e.g., it may be desirable for the UE 115-a to maintain connection to the network or it may be beneficial for the UE 115-a to connect to the wireless communications system 200). The attach request may also include a type of service that the UE 115-a provides. For example, the UE 115-a may act as a relay for other UEs in the wireless communications system 200.

Based on the attach request, the base station 105-a may facilitate authentication and/or authorization of the UE 115-*a* through the core network (e.g., core network 130 in FIG. 1). For example, the UE 115-*a* may undergo an authentication and key agreement (AKA) process used to authenticate the UE 115-*a* prior to establishing connection with the wireless communications system 200. In this process, an authentication credential (e.g., a universal SIM credential) may be known to both the UE 115-*a* and an authentication server, such as a home subscriber server (HSS) of the core network of the wireless communications system 200.

Once authenticated, the UE 115-*a* may communicate with the core network based on a non-access stratum (NAS) protocol configured to securely establish and maintain connectivity between the UE 115-*a* and the core network. One or more core network nodes (e.g., a mobile management entity (MME), serving gateway, etc.) may inform the base station 105-*a* that the UE 115-*a* is authenticated and authorized to connect to the wireless communications system 200. Thereafter, the base station 105-*a* may establish an RRC connection with the UE 115-*a* (e.g., based on an access stratum (AS) protocol).

To establish an RRC connection, the base station jamming resilience manager 140-*a* may be configured to generate a security configuration. The security configuration may be generated and transmitted to the UE 115-*a* during the AS protocol or may be transmitted to the UE 115-*a* subsequent to the AS protocol. In some examples, the security configuration may be transmitted to the UE 115-*a* over a secure channel (e.g., a secure RRC channel), which may be established based at least in part on a shared key between the base station 105-*a* and the UE 115-*a*. In some examples, the shared key may be an eNB key ($K_{eNB}$) transmitted to the base station 105-*a* by a core network node (e.g., during or subsequent to the AKA process) and/or derived by the UE 115-*a*.

According to some aspects, the base station 105-*a* may generate an encrypted PDCCH message based at least in part on the security configuration. For example, the security configuration may include information indicating that the PDCCH message is encrypted using a multicast encryption key. In this instance, an encrypted PDCCH message may be broadcast or multicast to multiple UEs 115-*a* of the wireless communications system 200. The encrypted PDCCH message may be encrypted using an encryption key. The encryption key may be transmitted from the base station 105-*a* to the UE 115-*a* during the RRC connection and/or may be transmitted over a secure RRC channel (e.g., after an RRC connection is established). In some examples, the encryption key may be common to all UEs 115-*a* connected to or attempting to connect with the base station 105-*a*. In some cases, the encryption key may be randomly generated by the base station 105-*a* or the core network.

According to some aspects, the UE 115-*a* may be associated with an identifier (e.g., C-RNTI), which may be an identifier unique to the UE 115-*a*. The identifier may be assigned to the UE 115-*a* by the base station 105-*a* after establishing a connection with the base station 105-*a* (e.g., an RRC connection) or after establishing connection with the core network. The UE 115-*a* may also be associated with other identifiers (e.g., TMSI) unique to the UE 115-*a* which may not be assigned by the base station 105-*a*. The assigned identifier may be used by the base station 105-*a* to generating scheduling information for the UE 115-*a* and the UE 115-*a* may use the identifier to decode the scheduling information within a PDCCH message transmitted by the base station 105-*a*.

In some examples, the security configuration may include information indicating that the PDCCH message is encrypted using a unicast encryption key. The unicast encryption key may be unique to each UE 115-*a* connected to or attempting to connect to the base station 105-*a*. The unicast encryption key may be derived based on a key shared between the base station 105-*a* and the UE 115-*a*, such as a $K_{eNB}$.

In some examples, the security configuration may include information indicating that the PDCCH message is integrity protected. For example, the PDCCH message may include a MAC used to verify the integrity of the PDCCH message. In some instances, the MAC may be computed based on a PDCCH integrity protection key. The PDCCH integrity protection key may be common to all UEs 115-*a* connected to or attempting to connect with the base station 105-*a*. In other examples, the PDCCH integrity protection key may be unique to each UE 115-*a* of the wireless communications system 200. Other implementations of integrity protection may include using a CRC or replacing a CRC checksum with the MAC.

In some examples, the PDCCH integrity protection key may be same as the PDCCH encryption key, may be derivable from the PDCCH encryption key, or may be derivable from a shared key between the base station 105-*a* and the UE 115-*a*. A UE 115-*a* may compute a MAC based on a PDCCH encryption key unique to UE 115-*a* and may then compare the computer MAC with the MAC contained within a PDCCH (e.g., a PDDCH message transmitted from a base station 105-*a* to UE 115-*a*) to verify the integrity of the PDCCH message.

Based on the security configuration, the base station 105-*a* may generate an encrypted PDCCH message and may transmit the encrypted PDCCH message to the UE 115-*a* over communication link 205. The communication link 205 may be similar to communication links 125 as discussed with respect to FIG. 1. The communication link 205 may be a secure RRC channel over which a PDCCH encryption key may be transmitted. The communication link 205 may be a broadcast, multicast, or unicast channel for communication between the base station 105-*a* and the UE 115-*a*.

The UE jamming resilience manager 135-*a* may be configured to receive the security configuration from the base station 105-*a*. Based on the received security information, the UE may obtain the PDCCH encryption key. For example, the PDCCH encryption key may be transmitted within the security configuration to the UE 115-*a* (e.g., over a secure channel). The PDCCH encryption key may be derived by the UE 115-*a* based on a shared key between the UE 115-*a* and the base station 105-*a*. After obtaining the PDCCH encryption key, the UE 115-*a* may decrypt a PDCCH message transmitted (e.g., transmitted over communication link 205) from the base station 105-*a* to the UE 115-*a*.

In accordance with the present disclosure, the wireless communications system 200 implementing jamming resilience techniques, as described above, may prevent or limit jamming attacks from jamming signals 210 transmitted by a jamming device 120-*a*.

Figure 3:
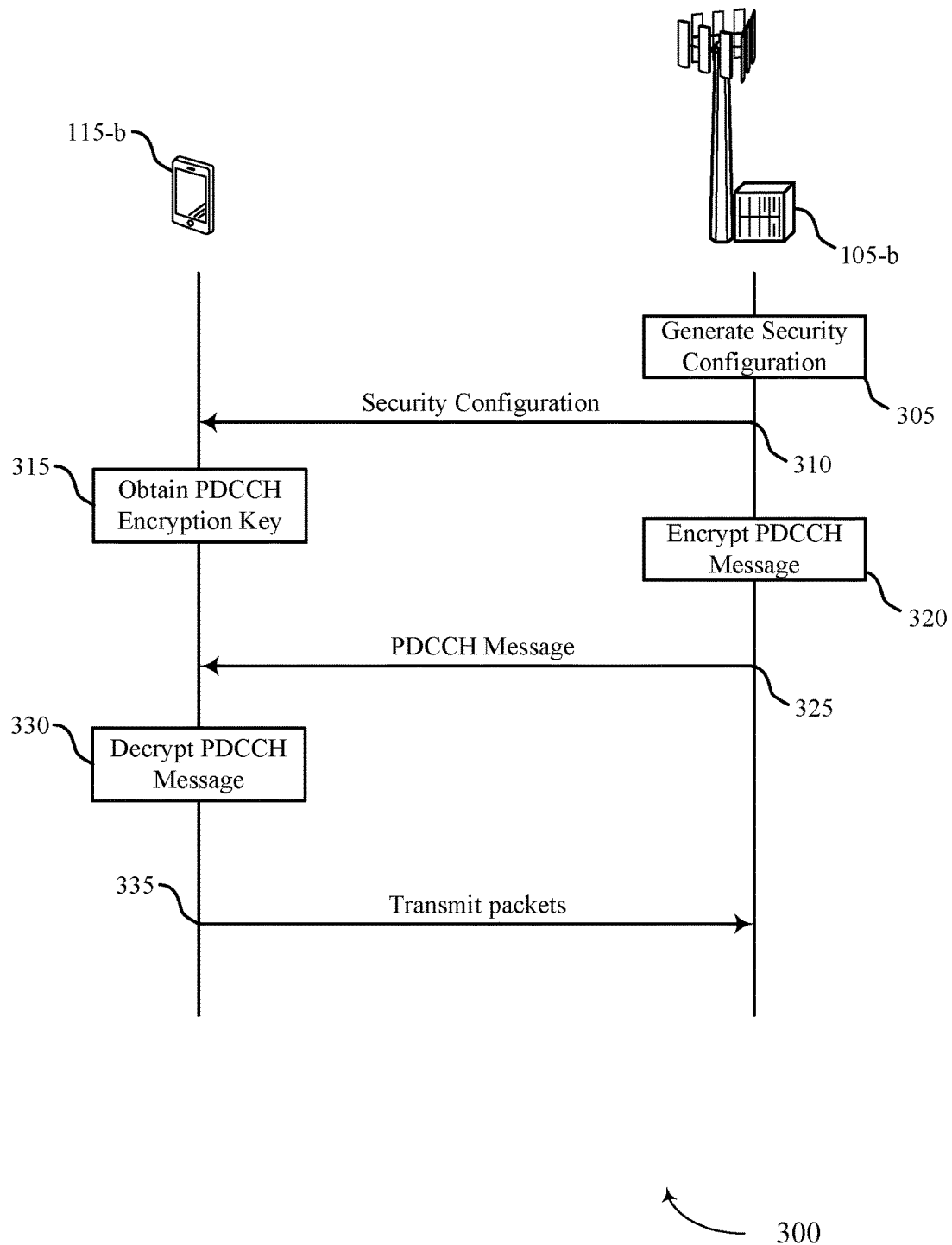
FIGS. 3 and 4 illustrate example process flows of mechanisms for downlink control channel encryption for jamming resilience in accordance with one or more one or more aspects of the present disclosure.

FIG. 3 illustrates an example of a process flow 300 for jamming resilience in accordance with various aspects of the present disclosure. In some cases, process flow 300 may represent aspects of techniques performed by a UE 115 or base station 105 as described with reference to FIGS. 1 and 2.

As shown at 305, base station 105-*b* may generate a security configuration. The security configuration may include information related to security of a PDCCH message to be transmitted from the base station 105-*b* to UE 115-*b*. For example, the security configuration may include information indicating the PDCCH message is encrypted using a multicast encryption key. In this instance, the PDCCH message may be broadcast or multicast to multiple UEs 115-*b* of a wireless communications system. The encrypted PDCCH message may be encrypted using an encryption key which may be included in the security configuration. In some examples, the security configuration may include information indicating that the PDCCH message is encrypted using a unicast encryption key derivable based on a key shared associated with the base station 105-*b* and the UE 115-*b*, such as a $K_{eNB}$.

In some examples, the security configuration may include information indicating that the PDCCH message is integrity protected using a MAC, CRC, or by replacing a CRC checksum with a MAC. According to various implementations, the MAC may be computed based on a PDCCH integrity protection key.

At 310, the base station 105-*b* may transmit the security configuration generated at 305 to the UE 115-*b*. The security configuration may be transmitted over a secure RRC channel. For example, the base station 105-*b* may transmit the PDCCH security configuration when establishing an RRC connection between the base station 105-*b* and the UE 115-*b*. In this example, the security configuration may include a PDCCH encryption key common to all UEs 115-*b* connected to or attempting to connect with the base station 105-*b*.

At 315, the UE 115-*b* may receive the security configuration and obtain a PDCCH encryption key based on the security configuration. For example, the UE 115-*b* may obtain the PDCCH encryption key directly from the security configuration.

At 320, the base station 105-*b* may encrypt a PDCCH message to be transmitted to UE 115-*b*. The base station 105-*b* may encrypt the PDCCH message based on the security configuration. For example, the PDCCH message may be encrypted based on a PDCCH encryption key contained within the security configuration.

Once encrypted, the base station 105-*b* transmits the encrypted PDCCH message to the UE 115-*b* at 325. In some examples, the encrypted PDCCH message may be transmitted over a secure channel, such as a secure RRC channel. In other examples, the encrypted PDCCH message may be broadcasted to multiple UEs (not shown) or may be transmitted to a single UE (e.g., UE 115-*b*) using a unicast channel.

At 330, the UE 115-*b* receives the PDCCH message transmitted at 325 and decrypts the PDCCH message using the PDCCH encryption key obtained at 315. By decrypting the PDCCH message, the UE 115-*b* may obtain scheduling information for the UE 115-*b* and may then transmit data packets to the base station 105-*b* at 335 based on the scheduling information obtained from decrypting the PDCCH message at 330.

Figure 4:
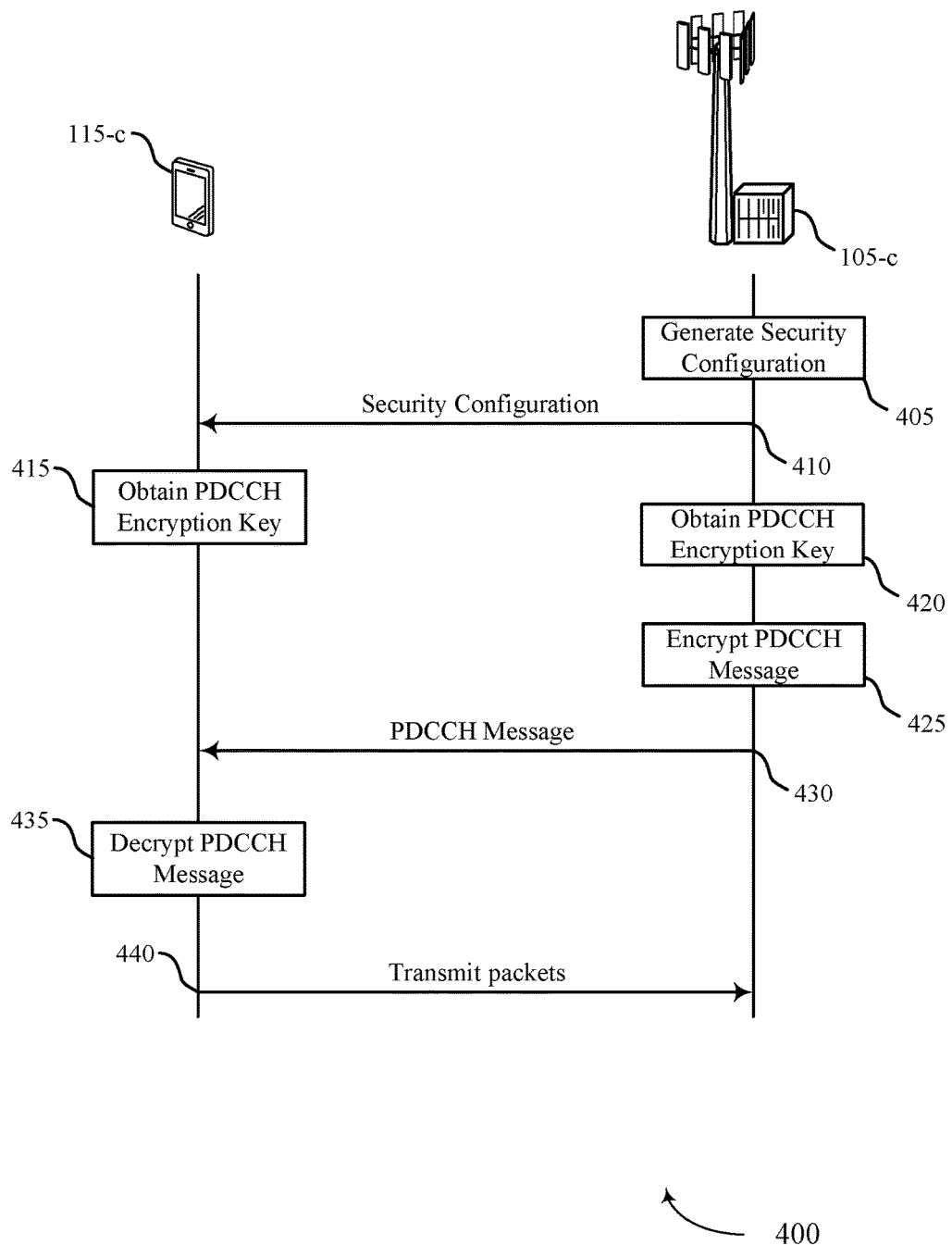

FIG. 4 illustrates an example of a process flow 400 for downlink control channel encryption for jamming resilience in accordance with various aspects of the present disclosure. Process flow 400 may include base station 105-*c* and UE 115-*c*, which may be examples of the corresponding devices described with reference to FIG. 1-2.

As shown at 405, base station 105-*c* may generate a security configuration. The security configuration may include information related to security of a PDCCH message to be transmitted from the base station 105-*c* to UE 115-*c*. For example, the security configuration may include information indicating the PDCCH message is encrypted using an encryption key. In some examples, the security configuration may include information indicating that the PDCCH message is encrypted using an encryption key derivable based on a key shared associated with the base station 105-*b* and the UE 115-*b*, such as a $K_{eNB}$.

In some examples, the security configuration may include information indicating that the PDCCH message is integrity protected using a MAC, CRC, or by replacing a CRC checksum with a MAC. According to various implementations, the MAC may be computed based on a PDCCH integrity protection key.

At 410, the base station 105-*c* may transmit the security configuration generated at 405 to the UE 115-*c*. The security configuration may be transmitted over a secure RRC channel. For example, the base station 105-*c* may transmit the PDCCH security configuration when establishing an RRC connection between the base station 105-*c* and the UE 115-*c*. In such an example, the security configuration may include information indicating that the encryption key is derivable from a shared key between the base station 105-*c* and the UE 115-*c*. The encryption key may be unique to each UE 115-*c* connected to or attempting to connect with the base station 105-*c*.

At 415, the UE 115-*c* may receive the security configuration and obtain a PDCCH encryption key based on the security configuration. For example, the UE 115-*c* may derive the PDCCH encryption key using information from the security configuration.

Similarly, at 420, the base station 105-*c* obtains the PDCCH encryption key based on the security configuration. For example, in some instances, a core network may indicate to at least one of the base station 105-*c* and the UE 115-*c* that the encryption key is based on a shared key such as a $K_{eNB}$. Thus, the base station 105-*c* may obtain the PDCCH encryption key at 420 based on the shared key. In some examples, the shared key which may be unique to each UE of the wireless communications system.

At 425, the base station 105-*c* may encrypt a PDCCH message to be transmitted to UE 115-*c*. The base station 105-*c* may encrypt the PDCCH message based on the security configuration and/or based on the encryption key obtained at 420.

Once encrypted, the base station 105-*c* transmits the encrypted PDCCH message to the UE 115-*b* at 430. In other examples, the encrypted PDCCH message may be broadcasted to multiple UEs (not shown) or may be transmitted to a single UE (e.g., UE 115-*c*) using a unicast channel.

At 435, the UE 115-*c* receives the PDCCH message transmitted at 430 and decrypts the PDCCH message using the PDCCH encryption key obtained at 415. By decrypting the PDCCH message, the UE 115-*c* may obtain scheduling information for the UE 115-*c* and may then transmit data packets to the base station 105-*c* at 440 based on the scheduling information obtained from decrypting the PDCCH message at 435.

Figure 5:
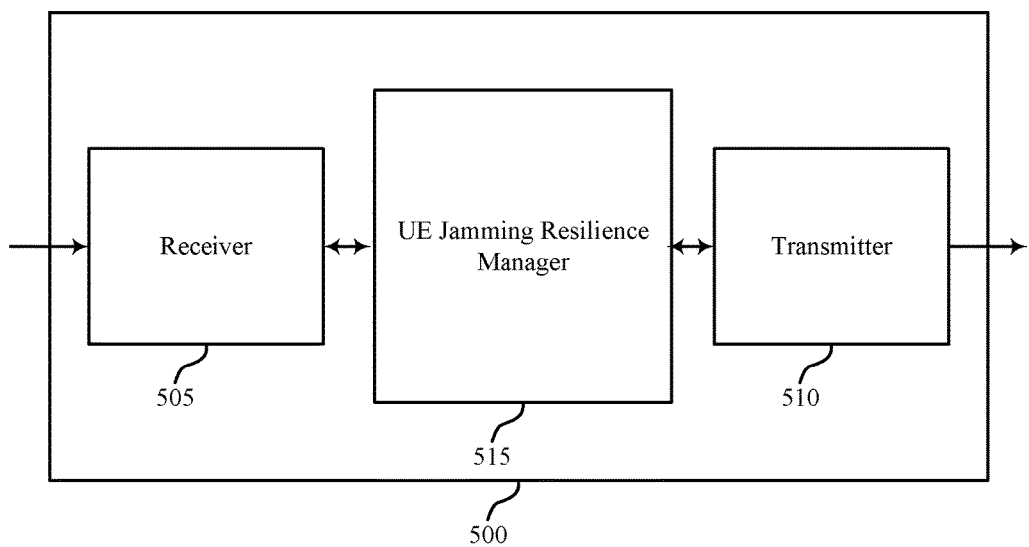
FIGS. 5 through 7 show block diagrams of a wireless device that supports downlink control channel encryption for jamming resilience in accordance with one or more aspects of the present disclosure.

FIG. 5 shows a block diagram of a wireless device 500 that supports downlink control channel encryption for jamming resilience in accordance with various aspects of the present disclosure. Wireless device 500 may be an example of aspects of a UE 115 described with reference to FIGS. 1 and 2. Wireless device 500 may include receiver 505, transmitter 510, and UE jamming resilience manager 515. Wireless device 500 may also include a processor. Each of these components may be in communication with each other.

The receiver 505 may receive information such as packets, user data, or control information associated with various information channels (e.g., control channels, data channels, and information related to downlink control channel encryption for jamming resilience, etc.). Information may be passed on to other components of the device. The receiver 505 may be an example of aspects of the transceiver 825 described with reference to FIG. 8.

The transmitter 510 may transmit signals received from other components of wireless device 500. In some examples, the transmitter 510 may be collocated with a receiver in a transceiver module. For example, the transmitter 510 may be an example of aspects of the transceiver 825 described with reference to FIG. 8. The transmitter 510 may include a single antenna, or may include a plurality of antennas.

The UE jamming resilience manager 515 may receive a security configuration from the base station, obtain a PDCCH encryption key based on the received security configuration, and decrypt a PDCCH message from the base station based on the obtained encryption key. The UE jamming resilience manager 515 may be an example of aspects of the UE jamming resilience manager 805 described with reference to FIG. 8.

Figure 6:
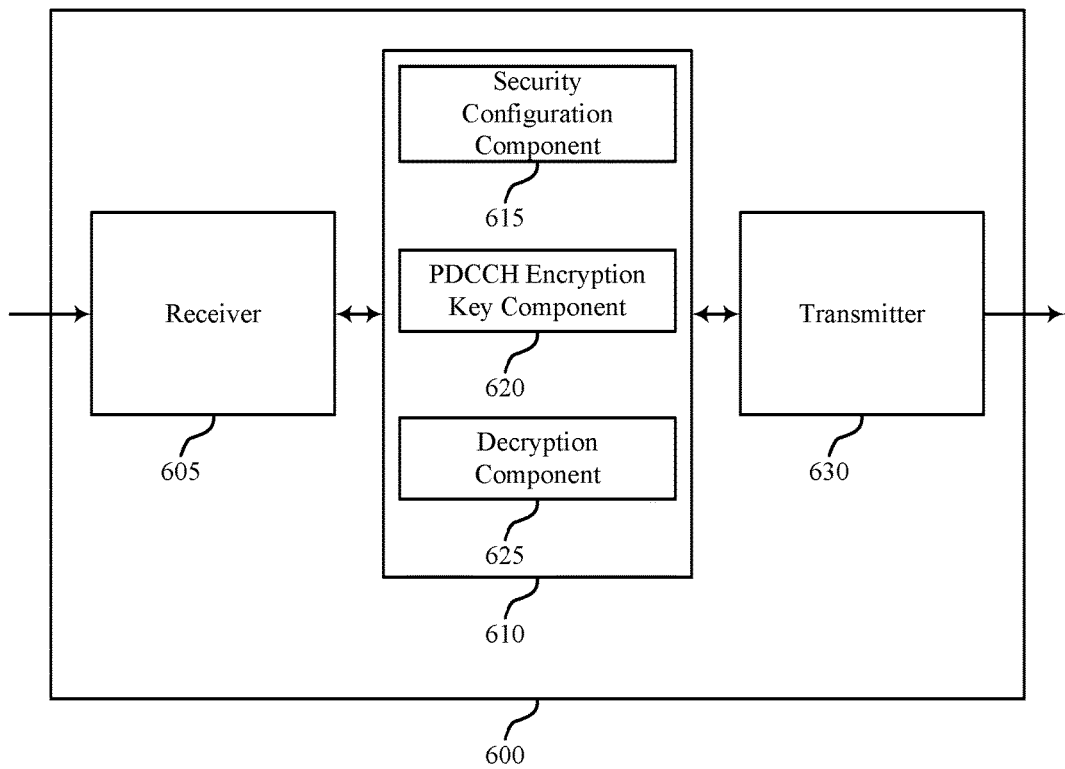

FIG. 6 shows a block diagram of a wireless device 600 that supports downlink control channel encryption for jamming resilience in accordance with various aspects of the present disclosure. Wireless device 600 may be an example of aspects of a wireless device 500 or a UE 115 described with reference to FIGS. 1, 2, and 5. Wireless device 600 may include receiver 605, UE jamming resilience manager 610, and transmitter 630. Wireless device 600 may also include a processor. Each of these components may be in communication with each other.

The receiver 605 may receive information which may be passed on to other components of the device. The receiver 605 may also perform the functions described with reference to the receiver 505 of FIG. 5. The receiver 605 may be an example of aspects of the transceiver 825 described with reference to FIG. 8.

The UE jamming resilience manager 610 may be an example of aspects of UE jamming resilience manager 515 described with reference to FIG. 5. The UE jamming resilience manager 610 may include security configuration component 615, PDCCH encryption key component 620, and decryption component 625. The UE jamming resilience manager 610 may be an example of aspects of the UE jamming resilience manager 805 described with reference to FIG. 8.

The security configuration component 615 may receive a security configuration from the base station. In some cases, the security configuration includes information indicating that the PDCCH message is encrypted using a multicast encryption key, or the PDCCH message is encrypted using a unicast encryption key, or the PDCCH message is protected using a MAC. In some cases, the MAC is computed based on a PDCCH integrity protection key common to all client devices that receive the PDCCH integrity protection key from the base station. In some cases, the MAC is computed based on a PDCCH integrity protection key unique to the client device. In some cases, a CRC checksum of the PDCCH message is replaced by the MAC.

The PDCCH encryption key component 620 may obtain a PDCCH encryption key based on the received security configuration. In some cases, obtaining the PDCCH encryption key includes deriving the PDCCH encryption key based on a shared key between the base station and the client device. The decryption component 625 may decrypt a PDCCH message from the base station based on the obtained encryption key.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or may utilize a plurality of antennas.

Figure 7:
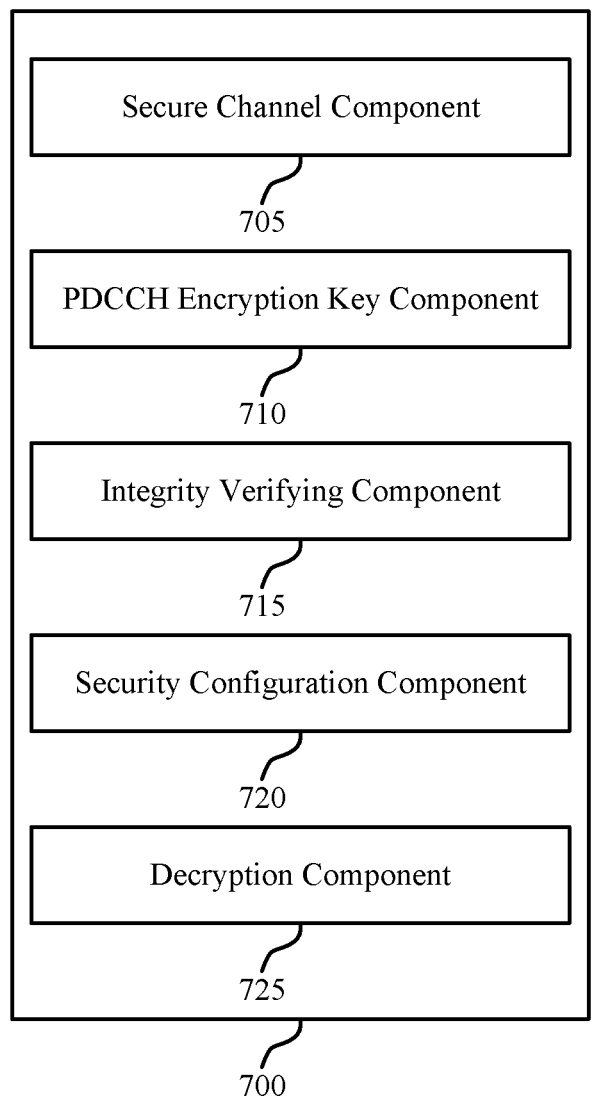

FIG. 7 shows a block diagram of a UE jamming resilience manager 700 which may be an example of the corresponding component of wireless device 500 or wireless device 600. That is, UE jamming resilience manager 700 may be an example of aspects of UE jamming resilience manager 515 or UE jamming resilience manager 610 described with reference to FIGS. 5 and 6. The UE jamming resilience manager 700 may also be an example of aspects of the UE jamming resilience manager 805 described with reference to FIG. 8.

The UE jamming resilience manager 700 may include secure channel component 705, PDCCH encryption key component 710, integrity verifying component 715, security configuration component 720, and decryption component 725. Each of these modules may communicate, directly or indirectly, with one another (e.g., via one or more buses).

The secure channel component 705 may establish and operate a secure channel. For example, the secure channel component 705 may receive the PDCCH encryption key from the base station over the secure channel established between the base station and the client device, and receive the security configuration over the secure channel established between the base station and the client device. In some cases, obtaining the PDCCH encryption key includes establishing a secure channel between the base station and the client device. In some cases, receiving the security configuration includes establishing a secure channel between the base station and the client device. In some cases, the secure channel is established based on a shared key between the base station and the client device. In some cases, the secure channel includes a RRC channel.

The PDCCH encryption key component 710 may obtain a PDCCH encryption key based on the received security configuration. The integrity verifying component 715 may verify integrity of the PDCCH message based on the received security configuration. Verifying may include computing a MAC based at least in part on a PDCCH integrity protection key common to all client devices that receive a PDCCH integrity protection key from the base station. Verifying may also include computing a MAC based at least in part on a PDCCH integrity protection key unique to the client device and comparing the computed MAC with a MAC included in the PDCCH.

The security configuration component 720 may receive a security configuration from the base station. The decryption component 725 may decrypt a PDCCH message from the base station based on the obtained encryption key.

Figure 8:
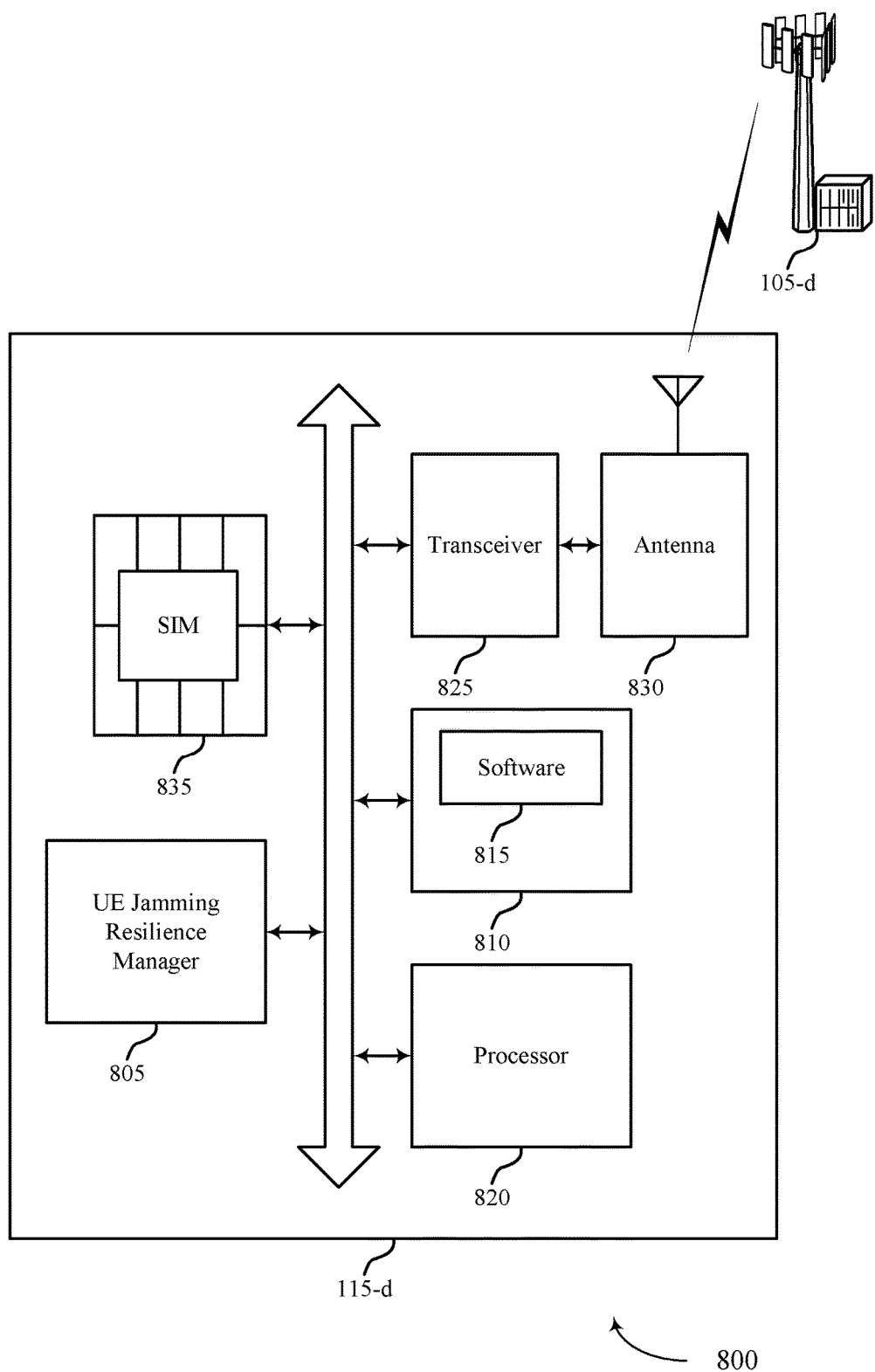
FIG. 8 illustrates a block diagram of a system including a UE that supports downlink control channel encryption for jamming resilience in accordance with one or more aspects of the present disclosure.

FIG. 8 shows a diagram of a system 800 including a device that supports downlink control channel encryption for jamming resilience in accordance with various aspects of the present disclosure. For example, system 800 may include UE 115-*d*, which may be an example of a wireless device 500, a wireless device 600, or a UE 115 as described with reference to FIGS. 1, 2, and 5 through 7.

UE 115-*d* may also include UE jamming resilience manager 805, memory 810, processor 820, transceiver 825, antenna 830, and SIM 835. Each of these modules may communicate, directly or indirectly, with one another (e.g., via one or more buses). The UE jamming resilience manager 805 may be an example of a UE jamming resilience manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., downlink control channel encryption for jamming resilience, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a base station 105 or a UE 115. The transceiver 825 may also include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

SIM 835 may be an IC that securely stores the IMSI and the related key used to identify and authenticate UE 115-d. SIM 835 may also contain a unique serial number, security authentication and ciphering information, temporary information related to the local network, a list of the services, a PIN, and a PUK for PIN unlocking. In some cases, SIM 835 may be a circuit embedded in a removable card.

Figure 9:
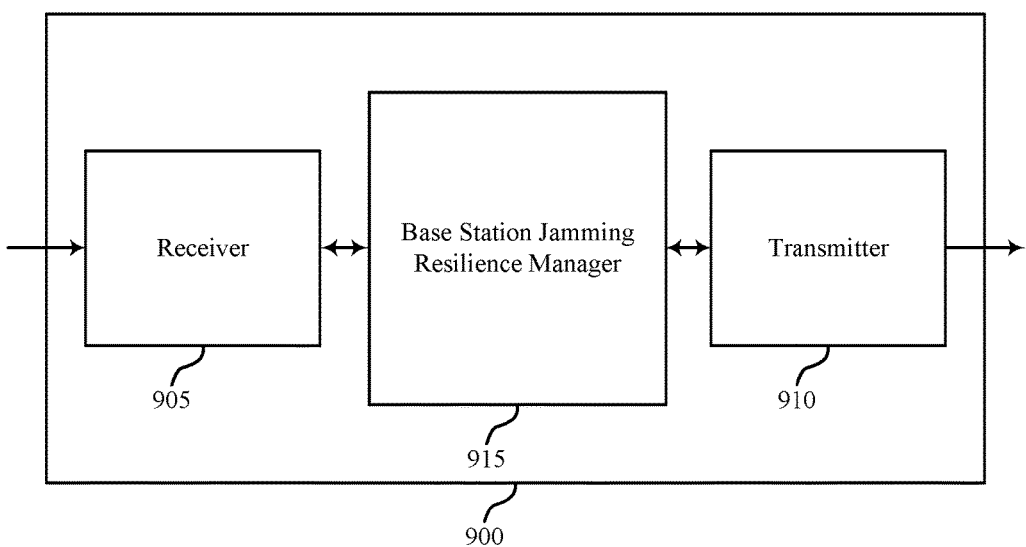
FIGS. 9 through 11 show block diagrams of a wireless device that supports downlink control channel encryption for jamming resilience in accordance with one or more aspects of the present disclosure.

FIG. 9 shows a block diagram of a wireless device 900 that supports downlink control channel encryption for jamming resilience in accordance with various aspects of the present disclosure. Wireless device 900 may be an example of aspects of a base station 105 described with reference to FIGS. 1 and 2. Wireless device 900 may include receiver 905, transmitter 910, and base station jamming resilience manager 915. Wireless device 900 may also include a processor. Each of these components may be in communication with each other.

The receiver 905 may receive information such as packets, user data, or control information associated with various information channels (e.g., control channels, data channels, and information related to downlink control channel encryption for jamming resilience, etc.). Information may be passed on to other components of the device. The receiver 905 may be an example of aspects of the transceiver 1225 described with reference to FIG. 12.

The transmitter 910 may transmit signals received from other components of wireless device 900. In some examples, the transmitter 910 may be collocated with a receiver in a transceiver module. For example, the transmitter 910 may be an example of aspects of the transceiver 1225 described with reference to FIG. 12. The transmitter 910 may include a single antenna, or may include a plurality of antennas.

The base station jamming resilience manager 915 may generate a security configuration, transmit the security configuration to a client device, obtain a PDCCH encryption key based on the security configuration, generate an encrypted PDCCH message based on the obtained PDCCH encryption key, and transmit the encrypted PDCCH message to the client device. The base station jamming resilience manager 915 may also be an example of aspects of the base station jamming resilience manager 1205 described with reference to FIG. 12.

Figure 10:
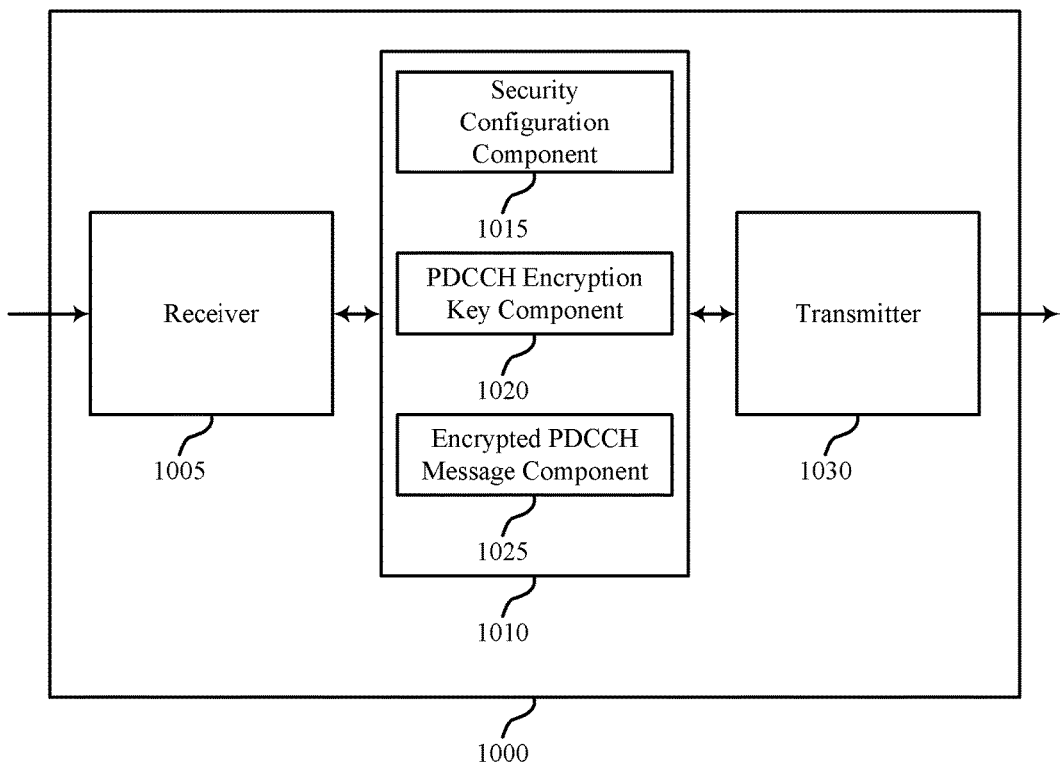

FIG. 10 shows a block diagram of a wireless device 1000 that supports downlink control channel encryption for jamming resilience in accordance with various aspects of the present disclosure. Wireless device 1000 may be an example of aspects of a wireless device 900 or a base station 105 described with reference to FIGS. 1, 2, and 9. Wireless device 1000 may include receiver 1005, base station jamming resilience manager 1010, and transmitter 1030. Wireless device 1000 may also include a processor. Each of these components may be in communication with each other.

The receiver 1005 may receive information which may be passed on to other components of the device. The receiver 1005 may also perform the functions described with reference to the receiver 905 of FIG. 9. The receiver 1005 may be an example of aspects of the transceiver 1225 described with reference to FIG. 12.

The base station jamming resilience manager 1010 may be an example of aspects of base station jamming resilience manager 915 described with reference to FIG. 9. The base station jamming resilience manager 1010 may include security configuration component 1015, PDCCH encryption key component 1020 and encrypted PDCCH message component 1025. The base station jamming resilience manager 1010 may be an example of aspects of the base station jamming resilience manager 1205 described with reference to FIG. 12.

The security configuration component 1015 may generate a security configuration, and transmit the security configuration to a client device. In some cases, the security configuration is based on a configuration of the base station. In some cases, the security configuration includes information indicating that the PDCCH message is encrypted using a multicast encryption key, or the PDCCH message is encrypted using a unicast encryption key, or the PDCCH message is protected using a MAC.

The PDCCH encryption key component 1020 may obtain a PDCCH encryption key based on the security configuration, transmit the obtained PDCCH encryption key to the client device, and generate the device-specific encryption key based on a shared key between the base station and the client device. In some cases, obtaining the PDCCH encryption key includes randomly generating the PDCCH encryption key. In some cases, the PDCCH encryption key is obtained based on a device-specific encryption key.

The encrypted PDCCH message component 1025 may generate an encrypted PDCCH message based on the obtained PDCCH encryption key, and transmit the encrypted PDCCH message to the client device.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or may utilize a plurality of antennas.

Figure 11:
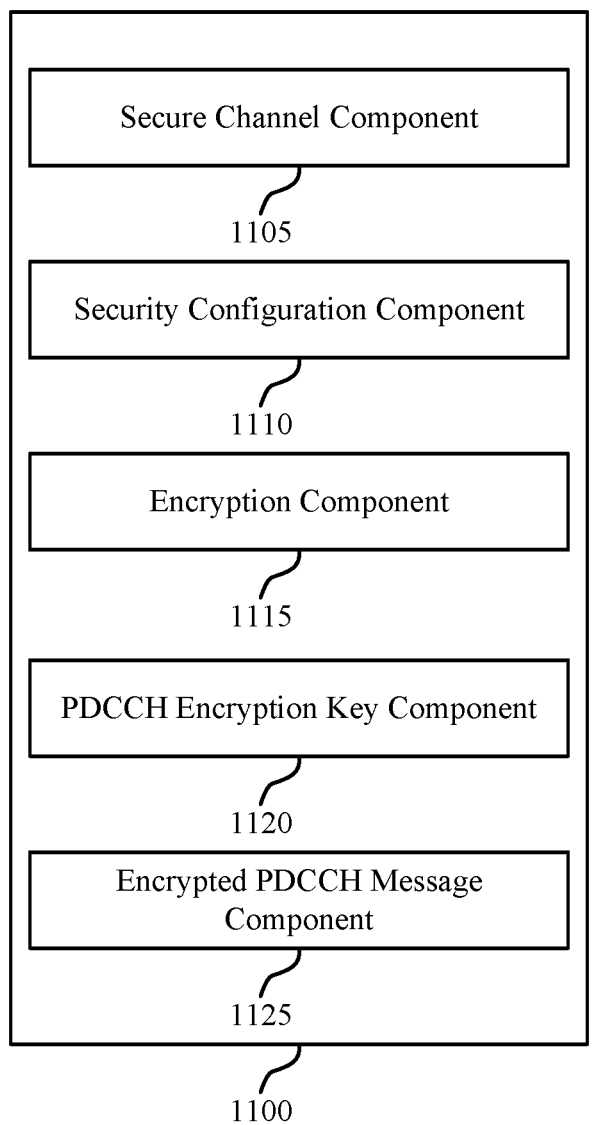

FIG. 11 shows a block diagram of a base station jamming resilience manager 1100, which may be an example of the corresponding component of wireless device 900 or wireless device 1000. That is, base station jamming resilience manager 1100 may be an example of aspects of base station jamming resilience manager 915 or base station jamming resilience manager 1010 described with reference to FIGS.

9 and 10. The base station jamming resilience manager 1100 may also be an example of aspects of the base station jamming resilience manager 1205 described with reference to FIG. 12.

The base station jamming resilience manager 1100 may include secure channel component 1105, security configuration component 1110, encryption component 1115, PDCCH encryption key component 1120 and encrypted PDCCH message component 1125. Each of these modules may communicate, directly or indirectly, with one another (e.g., via one or more buses).

The secure channel component 1105 may establish and operate a secure channel. For example, secure channel component 1105 may transmit the security configuration over the secure channel established between the base station and the client device, and establish a secure channel between the base station and the client device based on a shared key between the base station and the client device.

In some cases, transmitting the security configuration includes establishing a secure channel between the base station and the client device. In some cases, the MAC is computed based on a PDCCH integrity protection key common to all client devices that receive the PDCCH integrity protection key from the base station. In some cases, the MAC is computed based on a PDCCH integrity protection key unique to the client device. In some cases, a CRC checksum of the PDCCH message is replaced by the MAC.

The security configuration component 1110 may generate a security configuration, and transmit the security configuration to a client device. In some cases, the security configuration is based on a configuration of the base station. In some cases, the security configuration includes information indicating that the PDCCH message is encrypted using a multicast encryption key, or the PDCCH message is encrypted using a unicast encryption key, or the PDCCH message is protected using a MAC.

The encryption component 1115 may encrypt messages, such as a PDCCH message, using an encryption key. The PDCCH encryption key component 1120 may obtain a PDCCH encryption key based on the security configuration, transmit the obtained PDCCH encryption key to the client device, and generate the device-specific encryption key based on a shared key between the base station and the client device. In some cases, obtaining the PDCCH encryption key includes randomly generating the PDCCH encryption key. In some cases, the PDCCH encryption key is obtained based on a device-specific encryption key. The encrypted PDCCH message component 1125 may generate an encrypted PDCCH message based on the obtained PDCCH encryption key, and transmit the encrypted PDCCH message to the client device.

Figure 12:
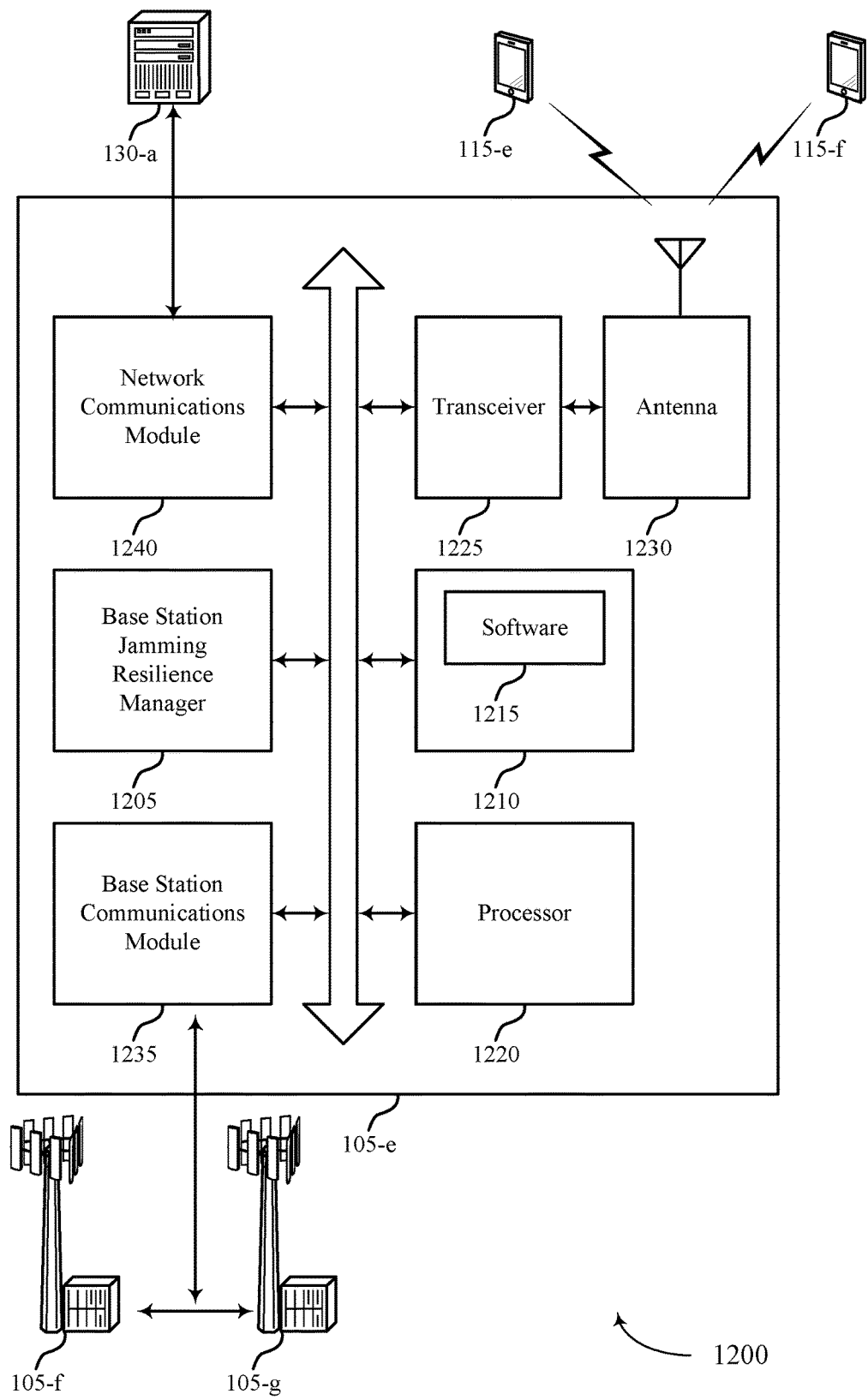
FIG. 12 illustrates a block diagram of a system including a base station that supports downlink control channel encryption for jamming resilience in accordance with one or more aspects of the present disclosure.

FIG. 12 shows a diagram of a wireless system 1200 including a device configured that supports downlink control channel encryption for jamming resilience in accordance with various aspects of the present disclosure. For example, system 1200 may include base station 105-e, which may be an example of a wireless device 900, a wireless device 1000, or a base station 105 as described with reference to FIGS. 1, 2, and 9 through 11. Base station 105-e may also include components for bi-directional voice and data communications including components for transmitting communications and components for receiving communications. For example, base station 105-e may communicate bi-directionally with one or more UEs 115.

Base station 105-e may also include base station jamming resilience manager 1205, memory 1210, processor 1220, transceiver 1225, antenna 1230, base station communications module 1235, and network communications module 1240. Each of these modules may communicate, directly or indirectly, with one another (e.g., via one or more buses). The base station jamming resilience manager 1205 may be an example of a base station jamming resilience manager as described with reference to FIGS. 9 through 11.

The memory 1210 may include RAM and ROM. The memory 1210 may store computer-readable, computer-executable software including instructions that, when executed, cause the processor to perform various functions described herein (e.g., downlink control channel encryption for jamming resilience, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a base station 105 or a UE 115. The transceiver 1225 may also include a modem to modulate the packets and provide the modulated packets to the antennas for transmission, and to demodulate packets received from the antennas. In some cases, the wireless device may include a single antenna 1230. However, in some cases the device may have more than one antenna 1230, which may be capable of concurrently transmitting or receiving multiple wireless transmissions.

The base station communications module 1235 may manage communications with other base stations 105-$f$ and 105-$g$, and may include a controller or scheduler for controlling communications with UEs 115 in cooperation with other base stations 105-$f$ and 105-$g$. For example, the base station communications module 1235 may coordinate scheduling for transmissions to UEs 115-$e$ and 115-$f$ for various interference mitigation techniques such as beamforming or joint transmission. In some examples, base station communications module 1235 may provide an X2 interface within an LTE/LTE-A wireless communication network technology to provide communication between base stations 105.

The network communications module 1240 may manage communications with the core network 130-$a$ (e.g., via one or more wired backhaul links). For example, the network communications module 1240 may manage the transfer of data communications for client devices, such as one or more UEs 115-$e$ and 115-$f$.

Figure 13:
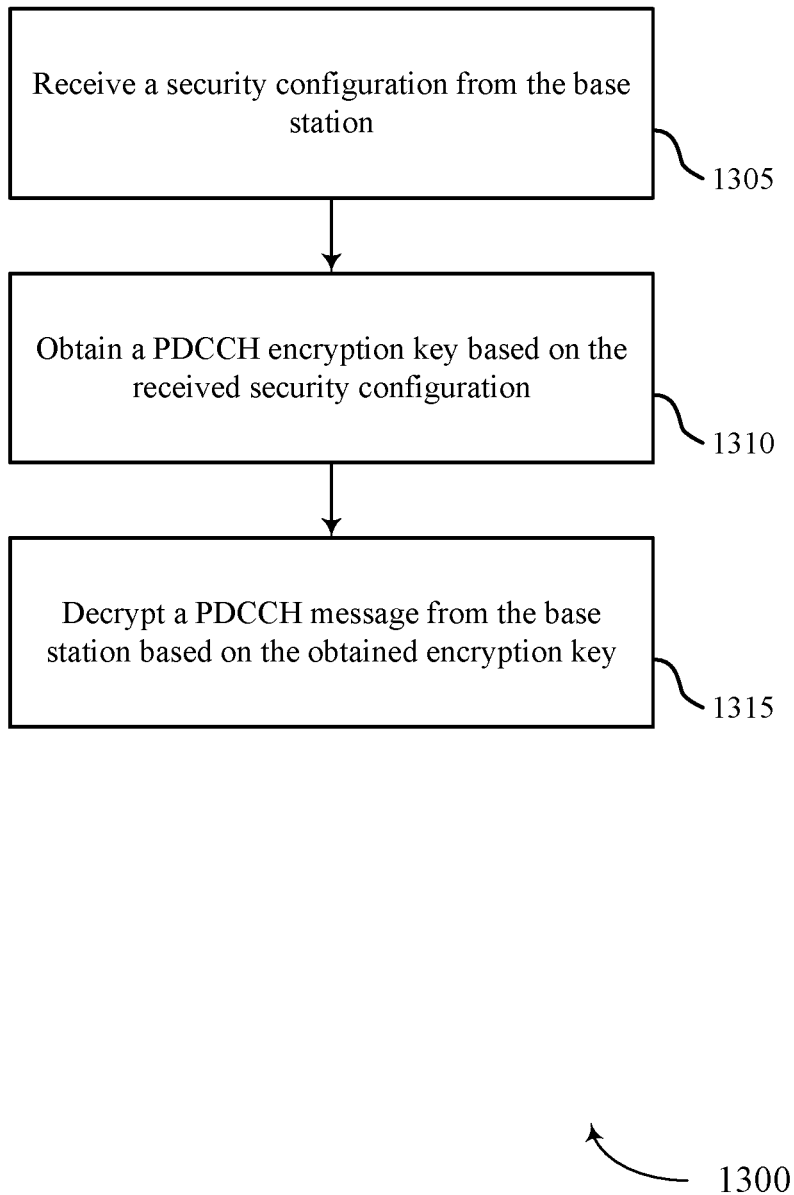
FIGS. 13 through 16 illustrate methods for downlink control channel encryption for jamming resilience in accordance with one or more aspects of the present disclosure.

FIG. 13 shows a flowchart illustrating a method 1300 for downlink control channel encryption for jamming resilience in accordance with various aspects of the present disclosure. The operations of method 1300 may be implemented by a device such as a UE 115 or its components as described with reference to FIGS. 1 and 2. For example, the operations of method 1300 may be performed by the UE jamming resilience manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive a security configuration from the base station as described above with reference to FIGS. 2 through 4. In certain examples, the operations of block 1305 may be performed by the security configuration component as described with reference to FIGS. 6 and 7.

At block 1310, the UE 115 may obtain a PDCCH encryption key based on the received security configuration as described above with reference to FIGS. 2 through 4. In certain examples, the operations of block 1310 may be performed by the PDCCH encryption key component as described with reference to FIGS. 6 and 7.

At block 1315, the UE 115 may decrypt a PDCCH message from the base station based on the obtained encryption key as described above with reference to FIGS. 2 through 4. In certain examples, the operations of block 1315 may be performed by the decryption component as described with reference to FIGS. 6 and 7.

Figure 14:
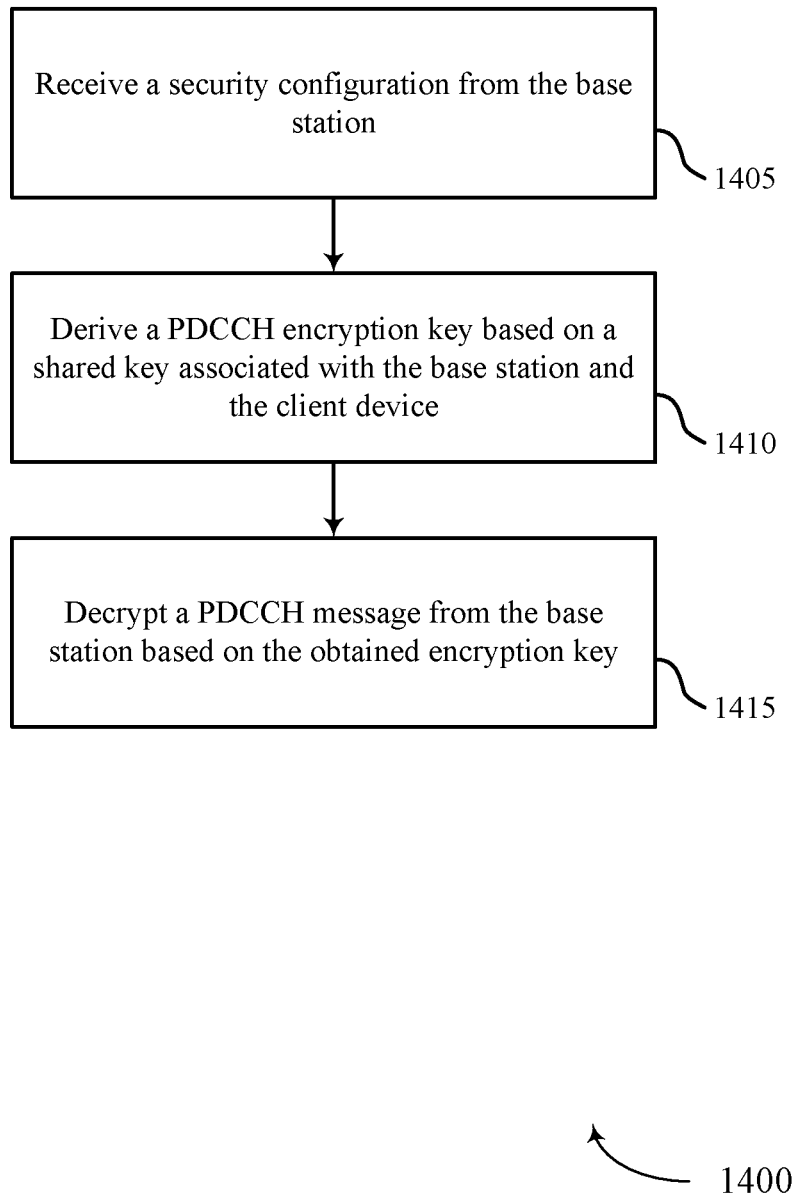

FIG. 14 shows a flowchart illustrating a method 1400 for downlink control channel encryption for jamming resilience in accordance with various aspects of the present disclosure. The operations of method 1400 may be implemented by a device such as a UE 115 or its components as described with reference to FIGS. 1 and 2. For example, the operations of method 1400 may be performed by the UE jamming resilience manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive a security configuration from the base station as described above with reference to FIGS. 2 through 4. In certain examples, the operations of block 1405 may be performed by the security configuration component as described with reference to FIGS. 6 and 7.

At block 1410, the UE 115 may obtain a PDCCH encryption key based on the received security configuration as described above with reference to FIGS. 2 through 4. In some cases, obtaining the PDCCH encryption key includes deriving the PDCCH encryption key based on a shared key between the base station and the client device. In certain examples, the operations of block 1410 may be performed by the PDCCH encryption key component as described with reference to FIGS. 6 and 7.

At block 1415, the UE 115 may decrypt a PDCCH message from the base station based on the obtained encryption key as described above with reference to FIGS. 2 through 4. In certain examples, the operations of block 1415 may be performed by the decryption component as described with reference to FIGS. 6 and 7.

Figure 15:
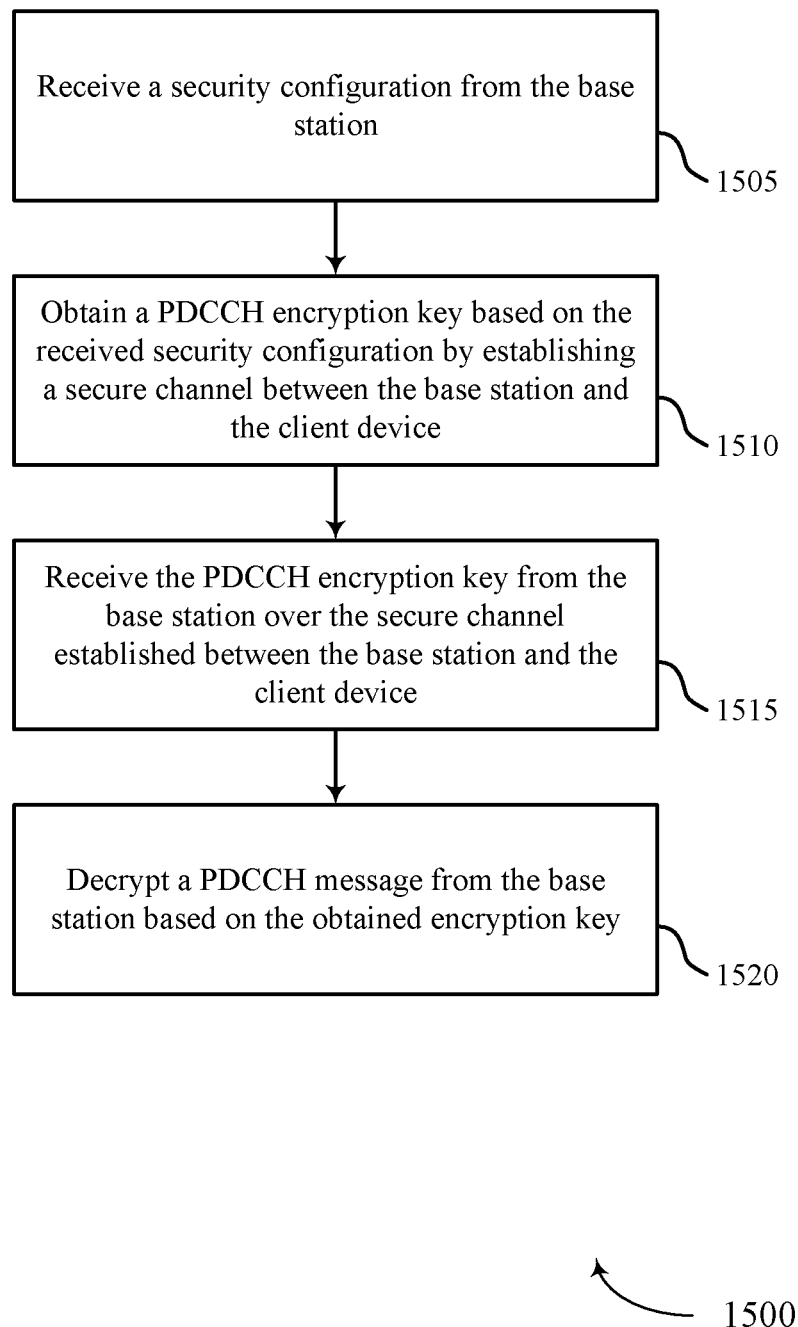

FIG. 15 shows a flowchart illustrating a method 1500 for downlink control channel encryption for jamming resilience in accordance with various aspects of the present disclosure. The operations of method 1500 may be implemented by a device such as a UE 115 or its components as described with reference to FIGS. 1 and 2. For example, the operations of method 1500 may be performed by the UE jamming resilience manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may receive a security configuration from the base station as described above with reference to FIGS. 2 through 4. In certain examples, the operations of block 1505 may be performed by the security configuration component as described with reference to FIGS. 6 and 7.

At block 1510, the UE 115 may obtain a PDCCH encryption key based on the received security configuration as described above with reference to FIGS. 2 through 4. In some cases, obtaining the PDCCH encryption key includes establishing a secure channel between the base station and the client device. In certain examples, the operations of block 1510 may be performed by the PDCCH encryption key component as described with reference to FIGS. 6 and 7.

At block 1515, the UE 115 may receive the PDCCH encryption key from the base station over the secure channel established between the base station and the client device as described above with reference to FIGS. 2 through 4. In certain examples, the operations of block 1515 may be performed by the secure channel component as described with reference to FIGS. 6 and 7.

At block 1520, the UE 115 may decrypt a PDCCH message from the base station based on the obtained encryption key as described above with reference to FIGS. 2 through 4. In certain examples, the operations of block 1520 may be performed by the decryption component as described with reference to FIGS. 6 and 7.

At block 1525, the UE 115 may as described above with reference to FIGS. 2 through 4. In certain examples, the operations of block 1525 may be performed by the secure channel component as described with reference to FIGS. 6 and 7.

Figure 16:
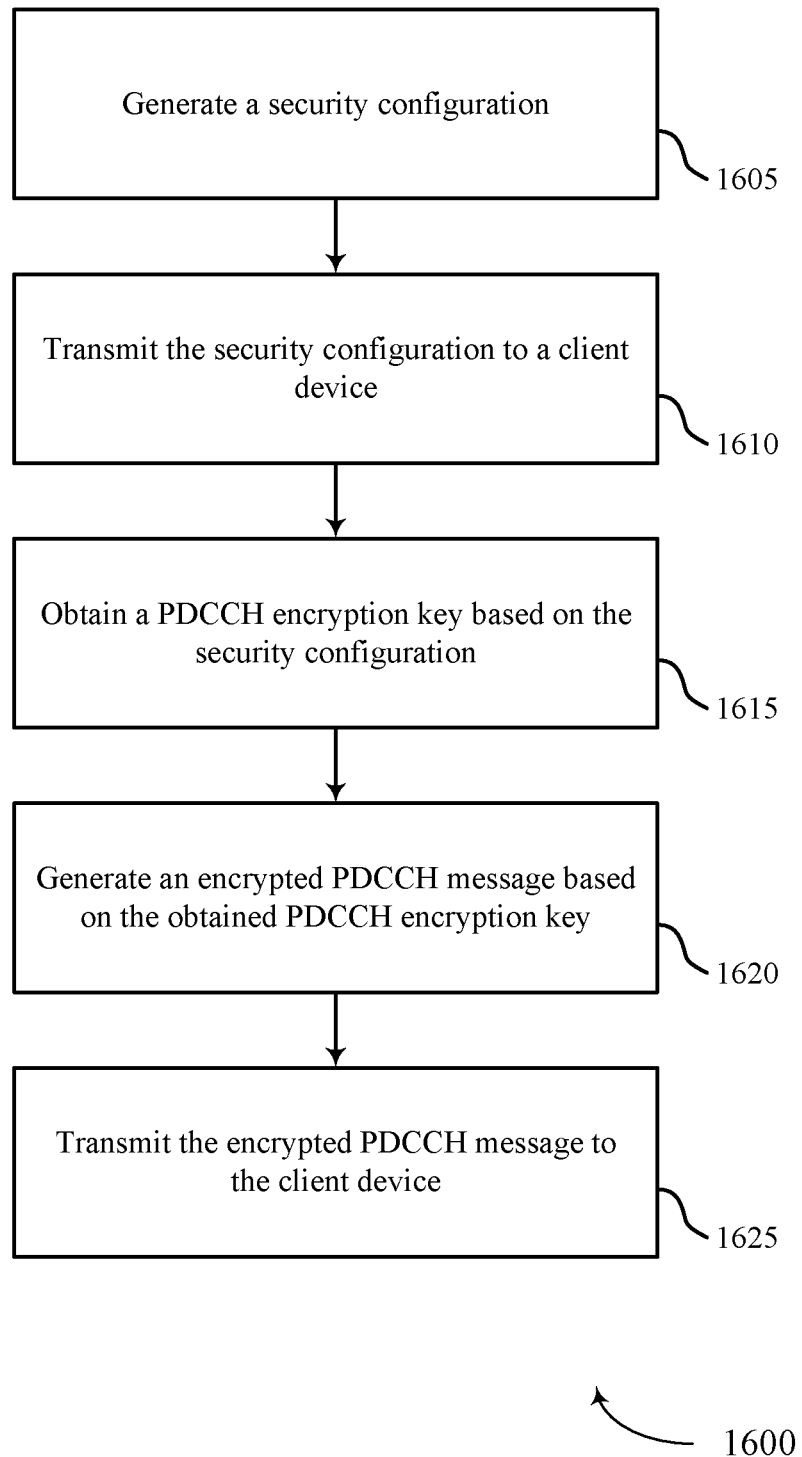

FIG. 16 shows a flowchart illustrating a method 1600 for downlink control channel encryption for jamming resilience in accordance with various aspects of the present disclosure. The operations of method 1600 may be implemented by a device such as a base station 105 or its components as described with reference to FIGS. 1 and 2. For example, the operations of method 1600 may be performed by the base station jamming resilience manager as described herein. In some examples, the base station 105 may execute a set of codes to control the functional elements of the device to perform the functions described below. Additionally or alternatively, the base station 105 may perform aspects the functions described below using special-purpose hardware.

At block 1605, the base station 105 may generate a security configuration as described above with reference to FIGS. 2 through 4. In certain examples, the operations of block 1605 may be performed by the security configuration component as described with reference to FIGS. 10 and 11.

At block 1610, the base station 105 may transmit the security configuration to a client device as described above with reference to FIGS. 2 through 4. In certain examples, the operations of block 1610 may be performed by the security configuration component as described with reference to FIGS. 10 and 11.

At block 1615, the base station 105 may obtain a PDCCH encryption key based on the security configuration as described above with reference to FIGS. 2 through 4. In certain examples, the operations of block 1615 may be performed by the PDCCH encryption key component as described with reference to FIGS. 10 and 11.

At block 1620, the base station 105 may generate an encrypted PDCCH message based on the obtained PDCCH encryption key as described above with reference to FIGS. 2 through 4. In certain examples, the operations of block 1620 may be performed by the encrypted PDCCH message component as described with reference to FIGS. 10 and 11.

At block 1625, the base station 105 may transmit the encrypted PDCCH message to the client device as described above with reference to FIGS. 2 through 4. In certain examples, the operations of block 1625 may be performed by the encrypted PDCCH message component as described with reference to FIGS. 10 and 11.

It should be noted that these methods describe possible implementation, and that the operations may be rearranged or otherwise modified such that other implementations are possible. In some examples, aspects from two or more of the methods may be combined. For example, aspects of each of the methods may include operations or aspects of the other methods, or other operations or techniques described herein. Thus, aspects of the disclosure may provide for downlink control channel encryption for jamming resilience.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above may be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that may be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that may be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or time division duplex (TDD) operation (e.g., using unpaired spectrum resources). Frame structures may be defined for FDD (e.g., frame structure type 1) and TDD (e.g., frame structure type 2).

Thus, aspects of the disclosure may provide for downlink control channel encryption for jamming resilience. It should be noted that these methods describe possible implementations, and that the operations may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one IC. In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:
1. A method of wireless communication at a client device, the method comprising:
   receiving a security configuration from a base station, wherein the security configuration comprises information indicating that a physical downlink control channel (PDCCH) message is encrypted using a multicast encryption key, or the PDCCH message is encrypted using a unicast encryption key, or the PDCCH message is protected using a message authentication code (MAC), or a combination thereof;
   obtaining a PDCCH encryption key based at least in part on the received security configuration; and
   decrypting the PDCCH message from the base station based at least in part on the obtained encryption key.
2. The method of claim 1, wherein obtaining the PDCCH encryption key comprises:
   deriving the PDCCH encryption key based at least in part on a shared key between the base station and the client device.
3. The method of claim 1, wherein obtaining the PDCCH encryption key comprises:
   establishing a secure channel between the base station and the client device; and
   receiving the PDCCH encryption key from the base station over the secure channel established between the base station and the client device.
4. The method of claim 1, wherein decrypting the PDCCH message comprises:
   verifying integrity of the PDCCH message based at least in part on the received security configuration.
5. The method of claim 4, wherein verifying the integrity of the PDCCH message comprises:

computing a computed MAC based at least in part on a PDCCH integrity protection key common to all client devices that receive the PDCCH integrity protection key from the base station.

6. The method of claim 4, wherein verifying the integrity of the PDCCH message comprises:
computing a computed MAC based at least in part on a PDCCH integrity protection key unique to the client device.

7. The method of claim 6, wherein verifying the integrity of the PDCCH message comprises:
comparing the computed MAC with the MAC included within the PDCCH.

8. The method of claim 6, wherein a cyclic redundancy check (CRC) checksum of the PDCCH message is replaced by the MAC.

9. The method of claim 1, wherein receiving the security configuration comprises:
establishing a secure channel between the base station and the client device; and
receiving the security configuration over the secure channel established between the base station and the client device.

10. The method of claim 1, wherein the secure channel is established based at least in part on a shared key between the base station and the client device.

11. The method of claim 1, wherein the secure channel comprises a radio resource control (RRC) channel.

12. A method of wireless communication at a base station, the method comprising:
generating a security configuration, wherein the security configuration comprises information indicating that a physical downlink control channel (PDCCH) message is encrypted using a multicast encryption key, or the PDCCH message is encrypted using a unicast encryption key, or the PDCCH message is protected using a message authentication code (MAC), or a combination thereof;
transmitting the security configuration to a client device;
obtaining a PDCCH encryption key based at least in part on the security configuration;
generating an encrypted PDCCH message based at least in part on the obtained PDCCH encryption key; and
transmitting the encrypted PDCCH message to the client device.

13. The method of claim 12, wherein the security configuration is based at least in part on a configuration of the base station.

14. The method of claim 12, wherein transmitting the security configuration comprises:
establishing a secure channel between the base station and the client device; and
transmitting the security configuration over the secure channel established between the base station and the client device.

15. The method of claim 12, wherein generating the encrypted PDCCH message comprises:
encrypting a PDCCH message using the obtained PDCCH encryption key.

16. The method of claim 15, further comprising:
transmitting the obtained PDCCH encryption key to the client device.

17. The method of claim 15, wherein obtaining the PDCCH encryption key comprises:
randomly generating the PDCCH encryption key.

18. The method of claim 15, wherein the PDCCH encryption key is obtained based at least in part on a device-specific encryption key.

19. The method of claim 18, further comprising:
generating the device-specific encryption key based at least in part on a shared key between the base station and the client device.

20. The method of claim 12, further comprising:
establishing a secure channel between the base station and the client device based at least in part on a shared key between the base station and the client device.

21. The method of claim 12, wherein generating the encrypted PDCCH message further comprises:
computing the MAC based at least in part on a PDCCH integrity protection key common to all client devices that receive the PDCCH integrity protection key from the base station.

22. The method of claim 12, wherein generating the encrypted PDCCH message further comprises:
computing the MAC based at least in part on a PDCCH integrity protection key unique to the client device.

23. The method of claim 22, wherein a CRC checksum of the PDCCH message is replaced by the MAC.

24. The method of claim 12, wherein the encrypted PDCCH message comprises the MAC.

25. An apparatus for wireless communication comprising:
a processor;
a memory in electronic communication with the processor; and
instructions stored in the memory, the instructions being executable by the processor to:
receive a security configuration from a base station, wherein the security configuration comprises information indicating that a physical downlink control channel (PDCCH) message is encrypted using a multicast encryption key, or the PDCCH message is encrypted using a unicast encryption key, or the PDCCH message is protected using a message authentication code (MAC), or a combination thereof;
obtain a PDCCH encryption key based at least in part on the received security configuration; and
decrypt a PDCCH message from the base station based at least in part on the obtained encryption key.

26. The method of claim 25, wherein the instructions are further executable by the processor to:
derive the PDCCH encryption key based at least in part on a shared key between the base station and the client device.

27. An apparatus for wireless communication comprising:
a processor;
a memory in electronic communication with the processor; and
instructions stored in the memory, the instructions being executable by the processor to:
generate a security configuration, wherein the security configuration comprises information indicating that a physical downlink control channel (PDCCH) message is encrypted using a multicast encryption key, or the PDCCH message is encrypted using a unicast encryption key, or the PDCCH message is protected using a message authentication code (MAC), or a combination thereof;
transmit the security configuration to a client device;
obtain a PDCCH encryption key based at least in part on the security configuration;
generate an encrypted PDCCH message based at least in part on the obtained PDCCH encryption key; and transmit the encrypted PDCCH message to the client device.

28. The method of claim 27, wherein the instructions are further executable by the processor to:

encrypt a PDCCH message using the obtained PDCCH encryption key.

* * * * *